s(12) United States Patent
Contreras et al.

(10) Patent No.: US 9,239,170 B2
(45) Date of Patent: Jan. 19, 2016

(54) INTEGRATED SELF-CONTAINED PLENUM MODULE

(71) Applicants: Joaquin Daniel Contreras, Yucaipa, CA (US); John Barry Edwards, Anaheim, CA (US)

(72) Inventors: Joaquin Daniel Contreras, Yucaipa, CA (US); John Barry Edwards, Anaheim, CA (US)

(73) Assignee: AIR DIVIDE, LLC, Redlands, CA (US)

( * ) Notice: Subject to any disclaimer, the term of this patent is extended or adjusted under 35 U.S.C. 154(b) by 145 days.

(21) Appl. No.: 13/872,284

(22) Filed: Apr. 29, 2013

(65) Prior Publication Data

US 2013/0237140 A1 Sep. 12, 2013

Related U.S. Application Data

(63) Continuation-in-part of application No. 13/288,882, filed on Nov. 3, 2011.

(60) Provisional application No. 61/410,300, filed on Nov. 4, 2010.

(51) Int. Cl.
| | | |
|---|---|---|
| H02P 23/00 | (2006.01) | |
| F24F 11/00 | (2006.01) | |
| F24F 13/02 | (2006.01) | |
| F24F 13/14 | (2006.01) | |

(52) U.S. Cl.
CPC ......... *F24F 11/0076* (2013.01); *F24F 13/0236* (2013.01); *F24F 13/14* (2013.01); *H02P 23/0072* (2013.01); *Y10T 137/87812* (2015.04)

(58) Field of Classification Search
CPC .................................................. H02P 23/0072
USPC .................................................. 318/280, 437
See application file for complete search history.

(56) References Cited

U.S. PATENT DOCUMENTS

| | | | |
|---|---|---|---|
| 3,389,858 A | | 6/1968 | Capps |
| 3,394,754 A | | 7/1968 | Schneeberg |
| 3,884,133 A | | 5/1975 | Miller |
| 4,028,597 A | * | 6/1977 | Delaney et al. ................. 318/87 |
| 4,108,371 A | | 8/1978 | Leemhuis |
| 4,134,050 A | | 1/1979 | Sibalis |
| 4,279,291 A | | 7/1981 | Lambert |
| 4,379,255 A | * | 4/1983 | Klose et al. ............. 250/214 PR |
| 4,460,036 A | | 7/1984 | Suzuki et al. |
| 4,527,734 A | | 7/1985 | Clark |
| 4,530,395 A | | 7/1985 | Parker et al. |
| 4,537,245 A | | 8/1985 | Mori |
| 4,549,601 A | | 10/1985 | Clark |
| 4,569,658 A | | 2/1986 | Wiggins |
| 4,711,394 A | | 12/1987 | Samuel |
| 4,724,505 A | | 2/1988 | Gelbort |
| 4,732,318 A | | 3/1988 | Osheroff |
| 4,819,716 A | | 4/1989 | Beachboard |
| 4,924,154 A | * | 5/1990 | Ogino ........................ 318/286 |

(Continued)

OTHER PUBLICATIONS

Comfort Plenum 4-Zone Plenum with Zone Dampers and Bypass Damper built in spec sheet; Econo-Plenum Return Air Plenum Economizer; www.comfortproductsinc.com (copyright—2013).

(Continued)

*Primary Examiner* — David S Luo
(74) *Attorney, Agent, or Firm* — Patent Law Agency, LLC; Peter Ganjian

(57) ABSTRACT

The present invention discloses a plenum module with compartmentalized interior that is subdivided, and partitioned into separate chambers by a set of wall panels.

13 Claims, 31 Drawing Sheets

(56) References Cited

U.S. PATENT DOCUMENTS

| | | | |
|---|---|---|---|
| 4,940,535 | A | 7/1990 | Fisher et al. |
| 5,299,601 | A | 4/1994 | Koch |
| 5,345,966 | A | 9/1994 | Dudley |
| 5,369,343 | A | 11/1994 | Niemila |
| 5,401,212 | A | 3/1995 | Genco |
| 5,520,328 | A | 5/1996 | Bujak |
| 5,642,628 | A | 7/1997 | Brownell |
| 5,705,734 | A | 1/1998 | Ahmed |
| 5,944,098 | A | 8/1999 | Jackson |
| 6,098,957 | A | 8/2000 | Vepy |
| 6,116,264 | A | 9/2000 | Bachmann |
| 6,184,641 | B1 | 2/2001 | Crimmins et al. |
| 6,295,823 | B1 | 10/2001 | Odom |
| 6,408,582 | B1 | 6/2002 | Shim |
| 6,471,182 | B1 | 10/2002 | McIntosh |
| 6,727,457 | B1 | 4/2004 | Vande Berg |
| 6,880,799 | B2 | 4/2005 | Mrozek |
| 6,972,535 | B1 | 12/2005 | Chen |
| 6,981,383 | B2 | 1/2006 | Pyranen |
| 7,017,827 | B2 | 3/2006 | Shah |
| 7,353,922 | B2 | 4/2008 | Furuya et al. |
| 7,766,246 | B2 | 8/2010 | Arneson |
| 8,584,709 | B2 | 11/2013 | Albert |
| 2003/0085033 | A1 | 5/2003 | Pretterson |
| 2006/0174560 | A1 | 8/2006 | Beggs |
| 2007/0262162 | A1 | 11/2007 | Karamanos |
| 2008/0128523 | A1 | 6/2008 | Hoglund |
| 2008/0161976 | A1 | 7/2008 | Stanimirovic |
| 2012/0111430 | A1 | 5/2012 | Edwards et al. |
| 2012/0234856 | A1 | 9/2012 | Cannon et al. |

OTHER PUBLICATIONS

ZoneFirst HVAC Zoning Systems—Zoning Design and Application guide; 2003.

Zone Control Board—www.ecojay.com; Oct 24, 2011;.

U.S. Appl. No. 13/288,882, Filing Date: Nov. 3, 2011 Office action date: Feb. 5, 2014.

* cited by examiner

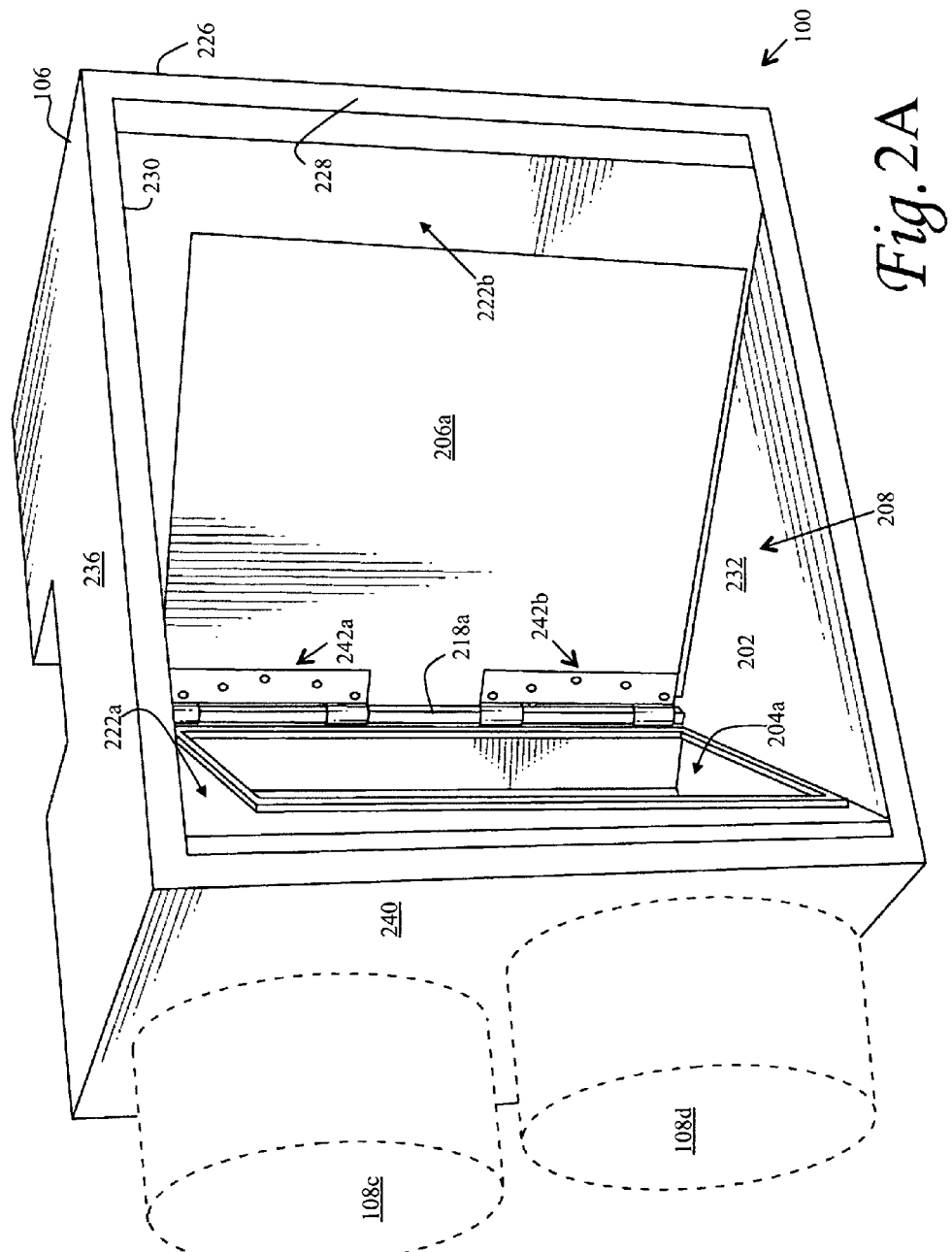

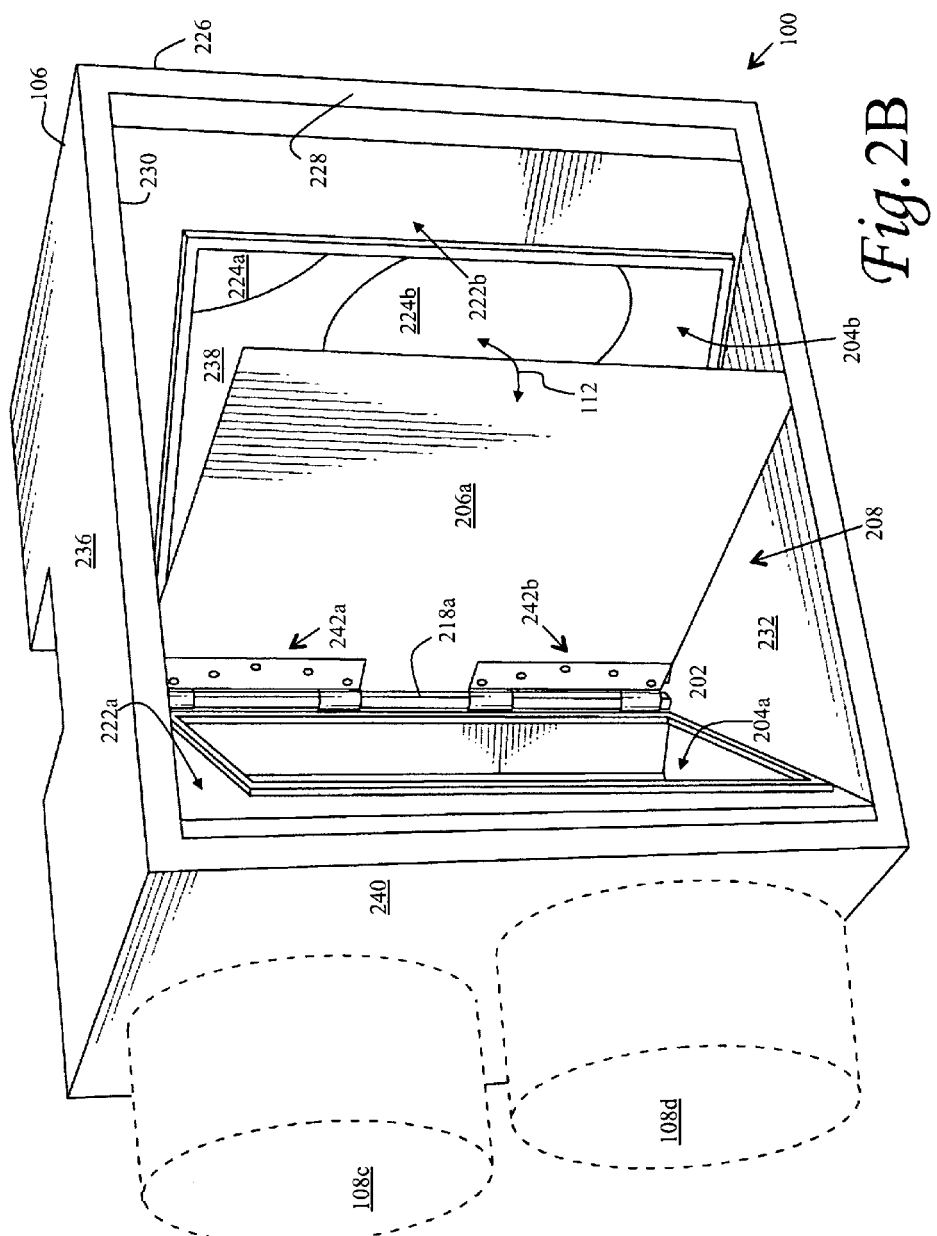

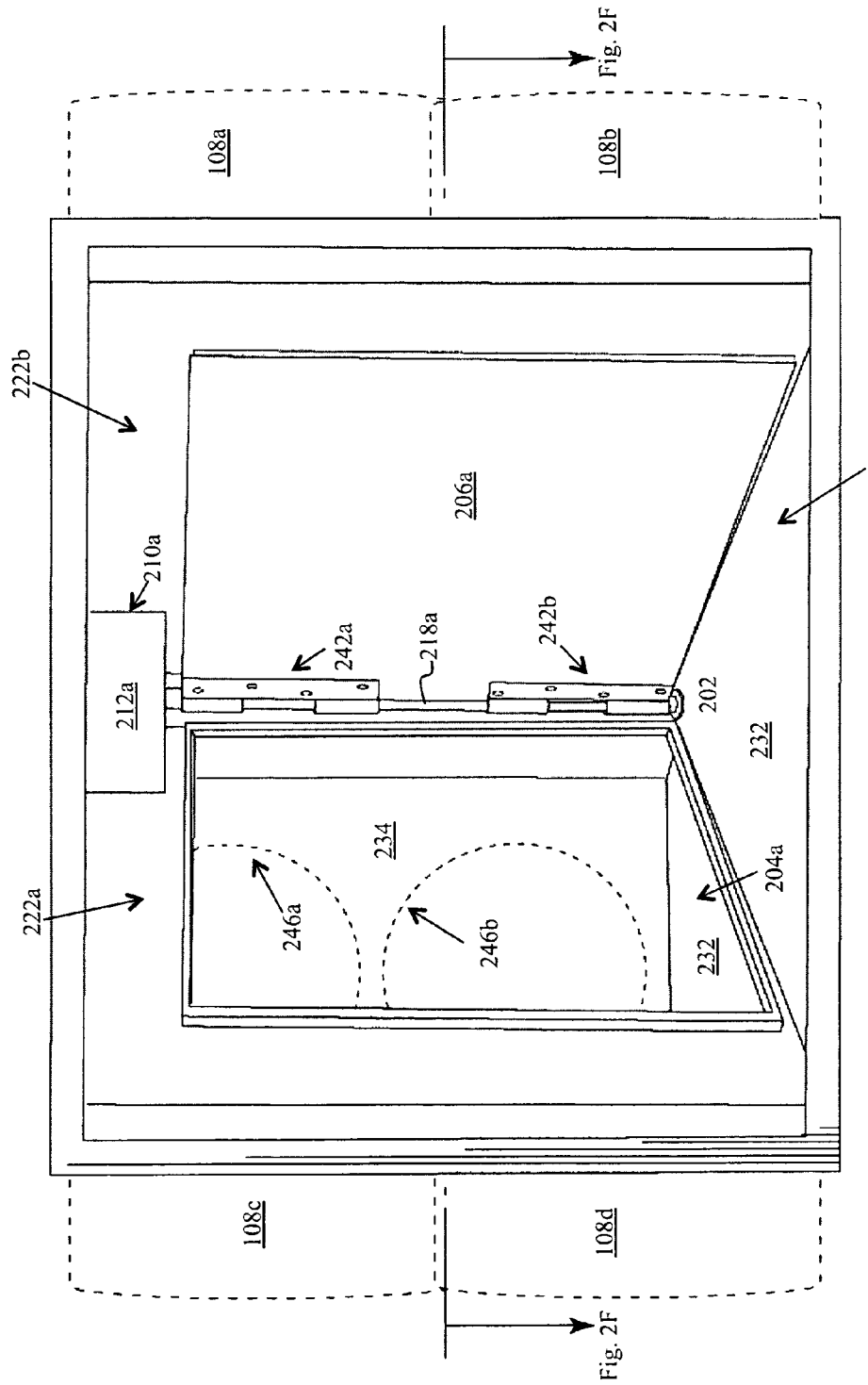

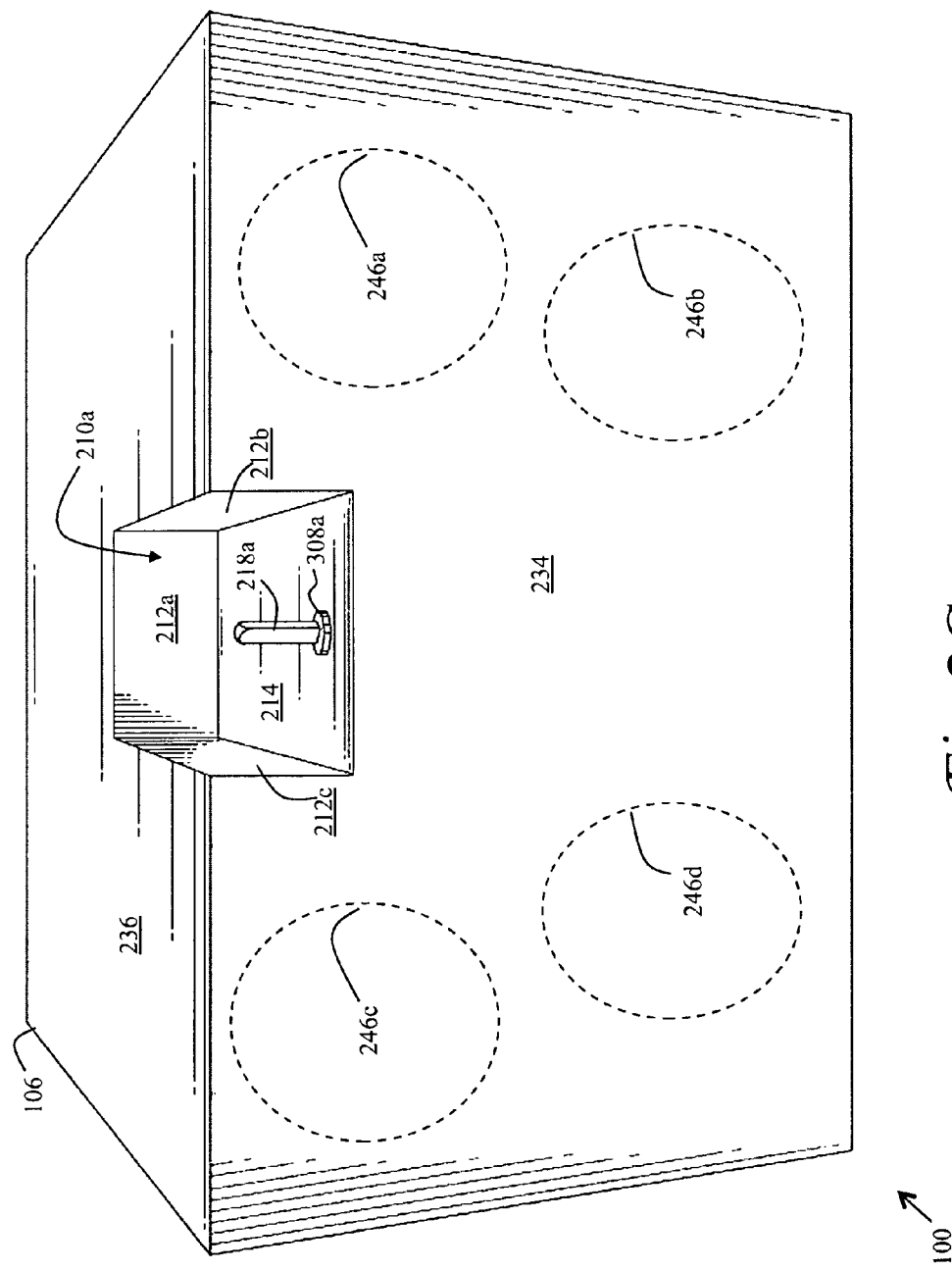

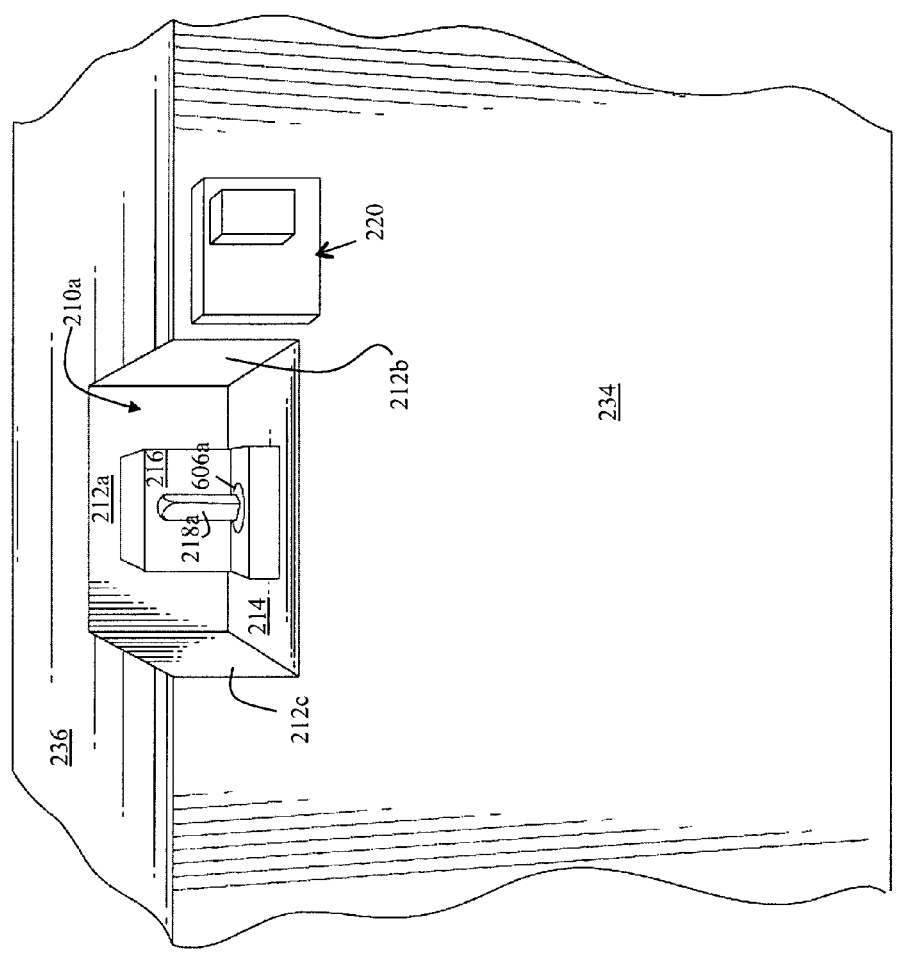

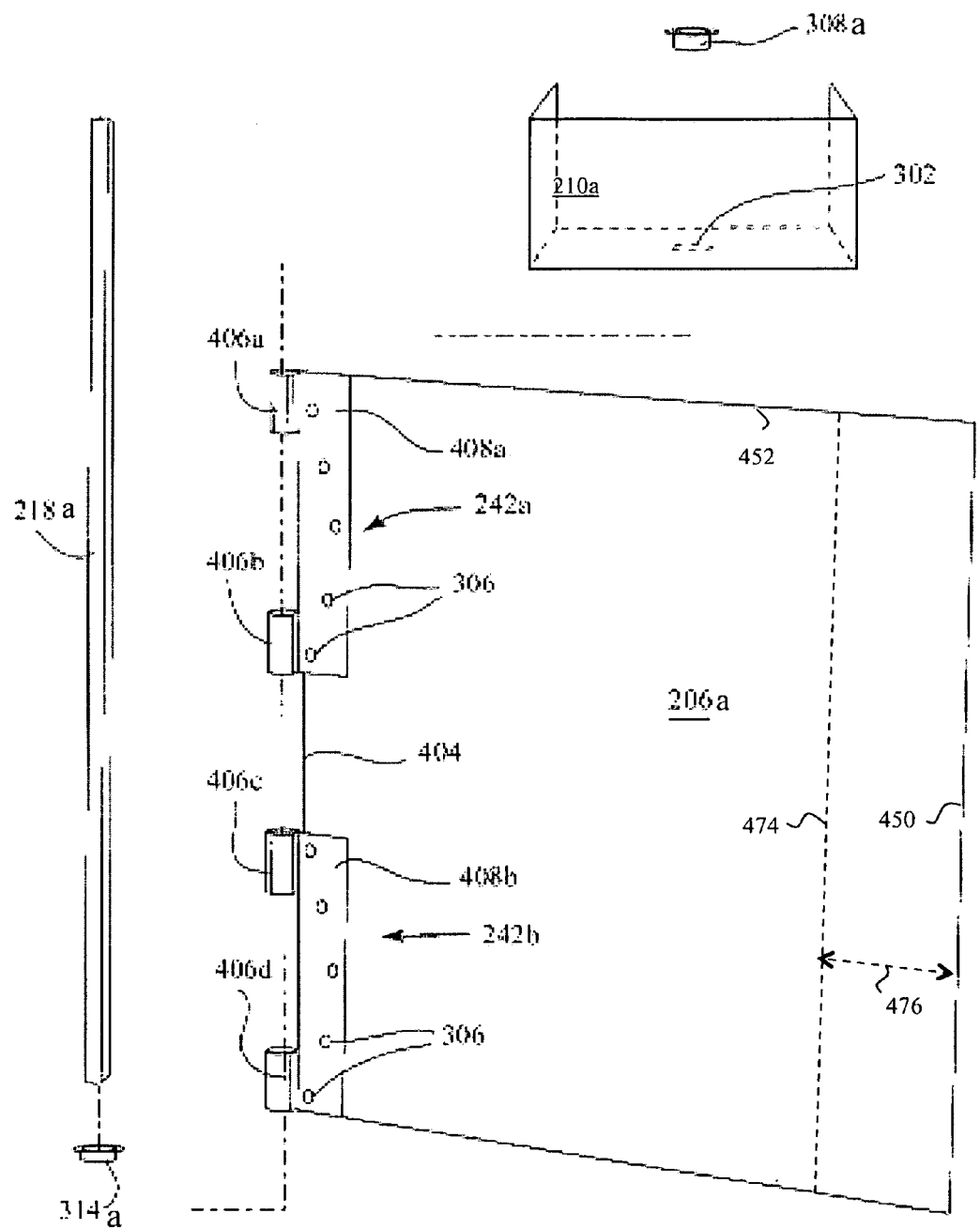

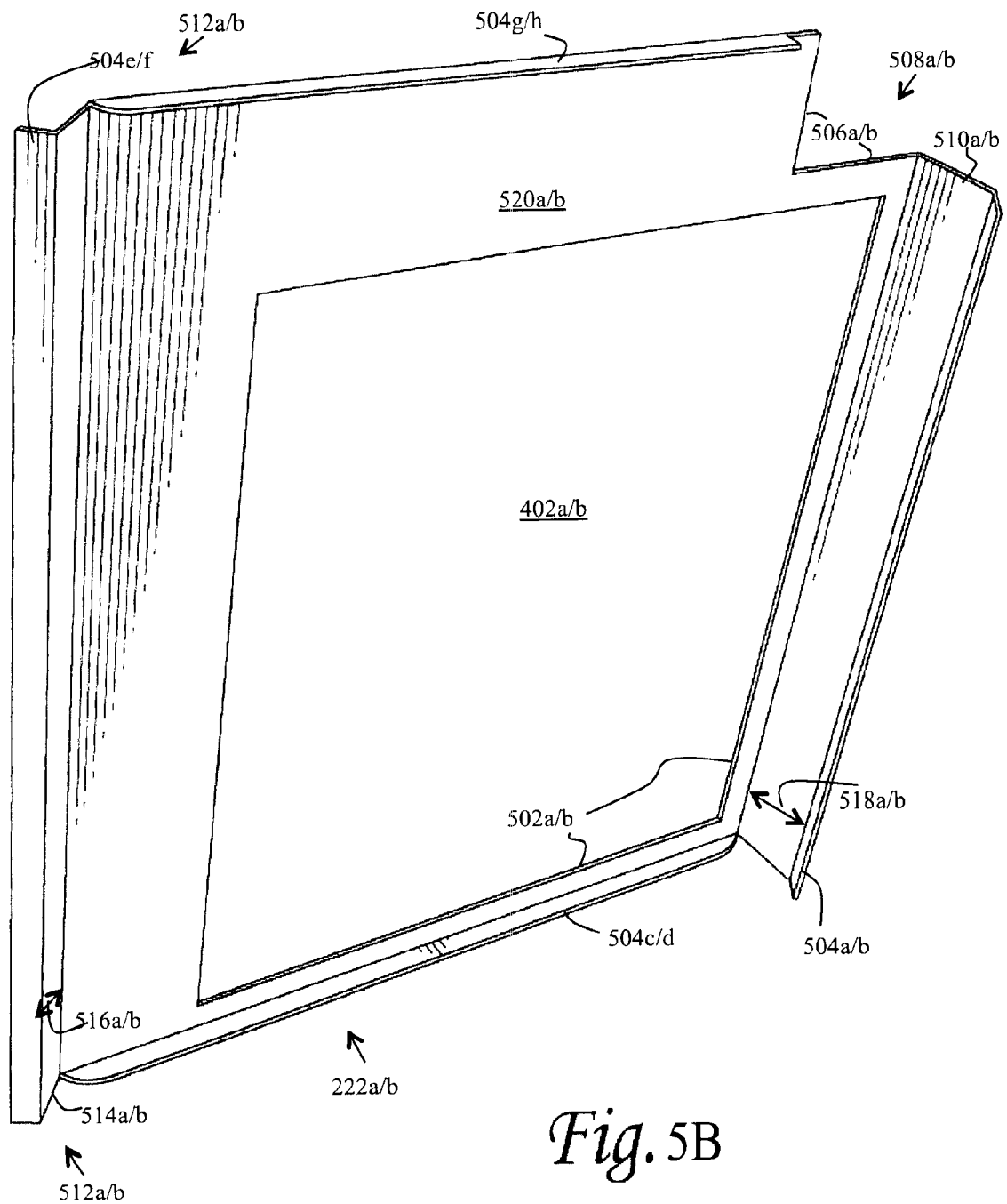

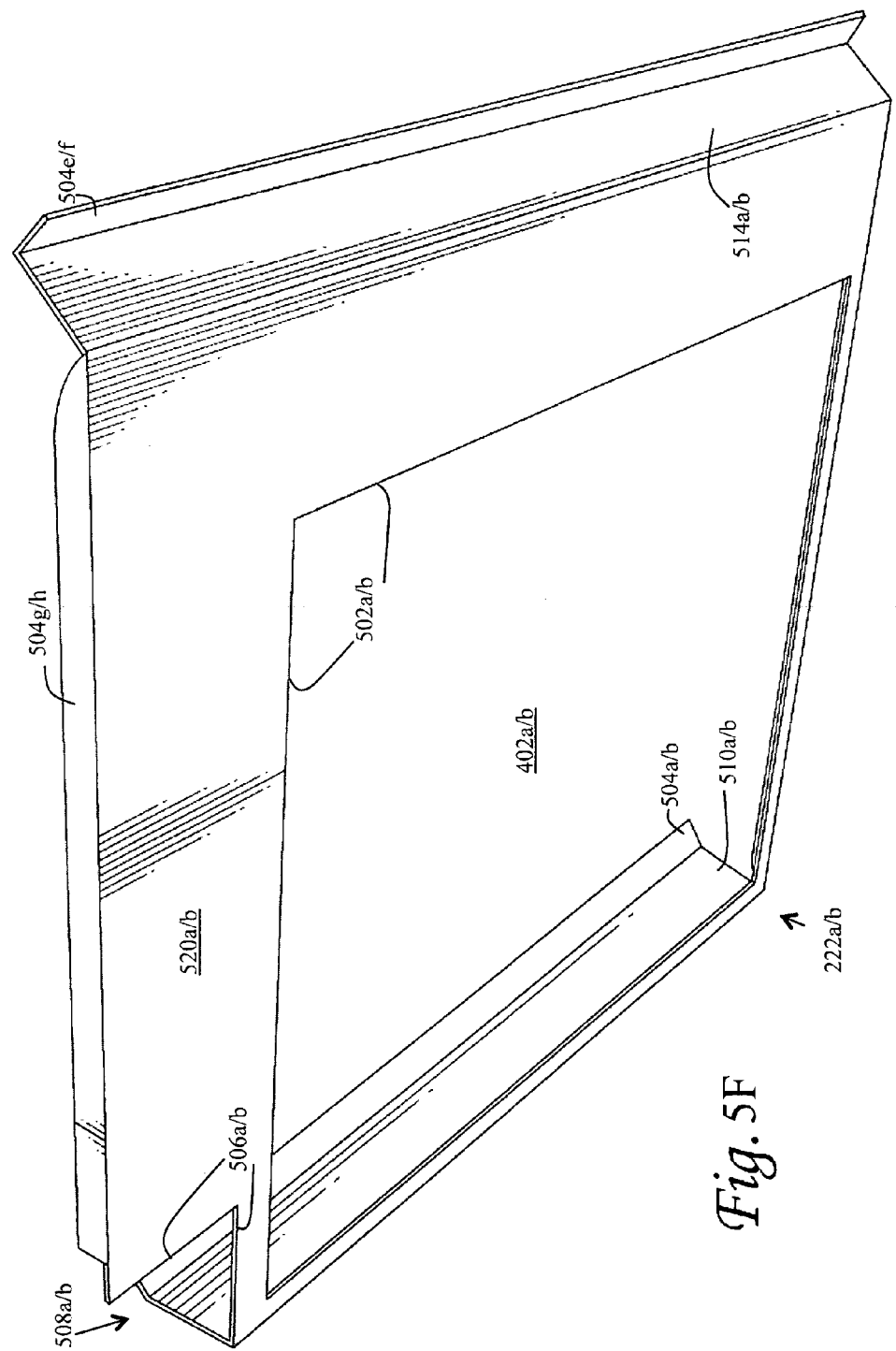

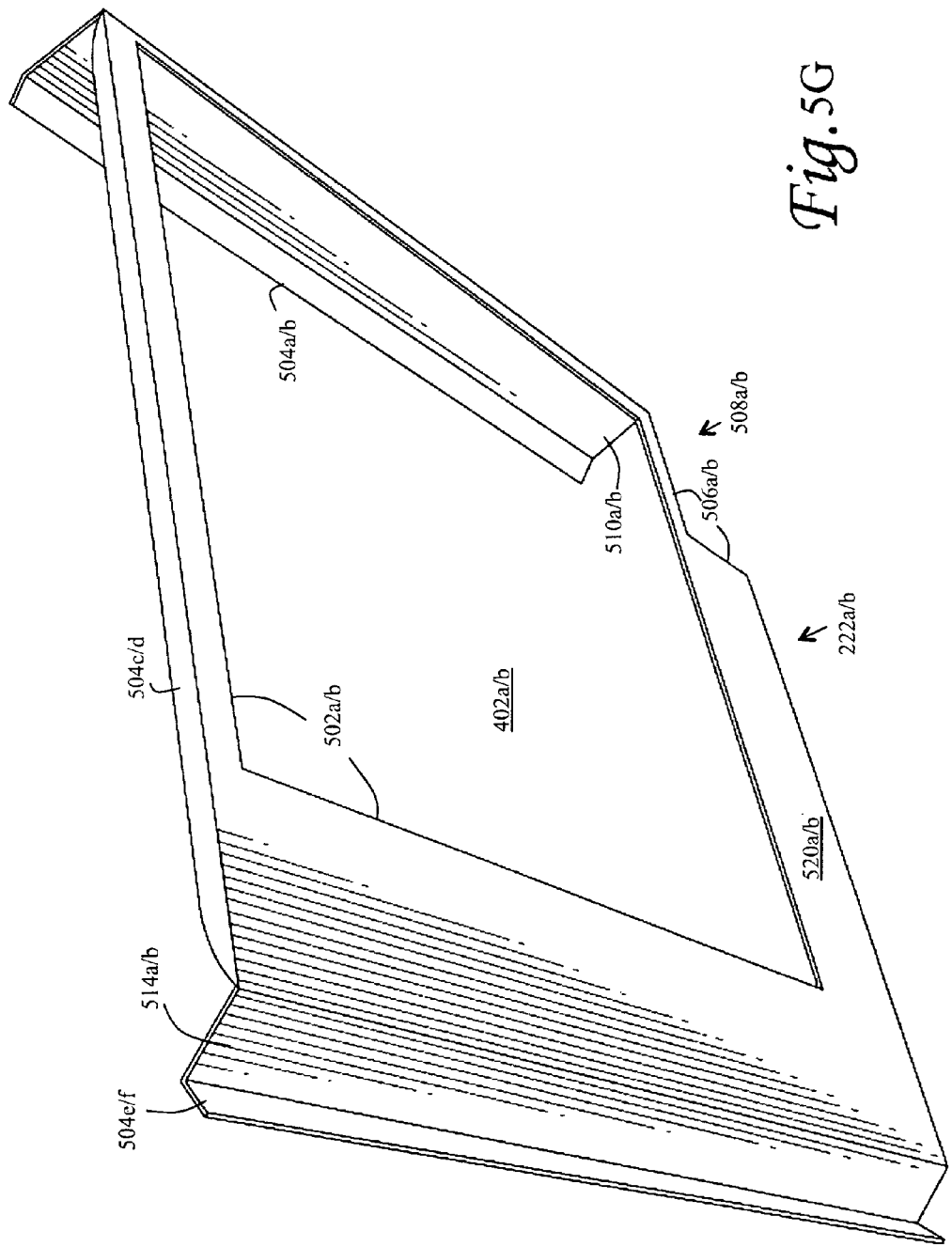

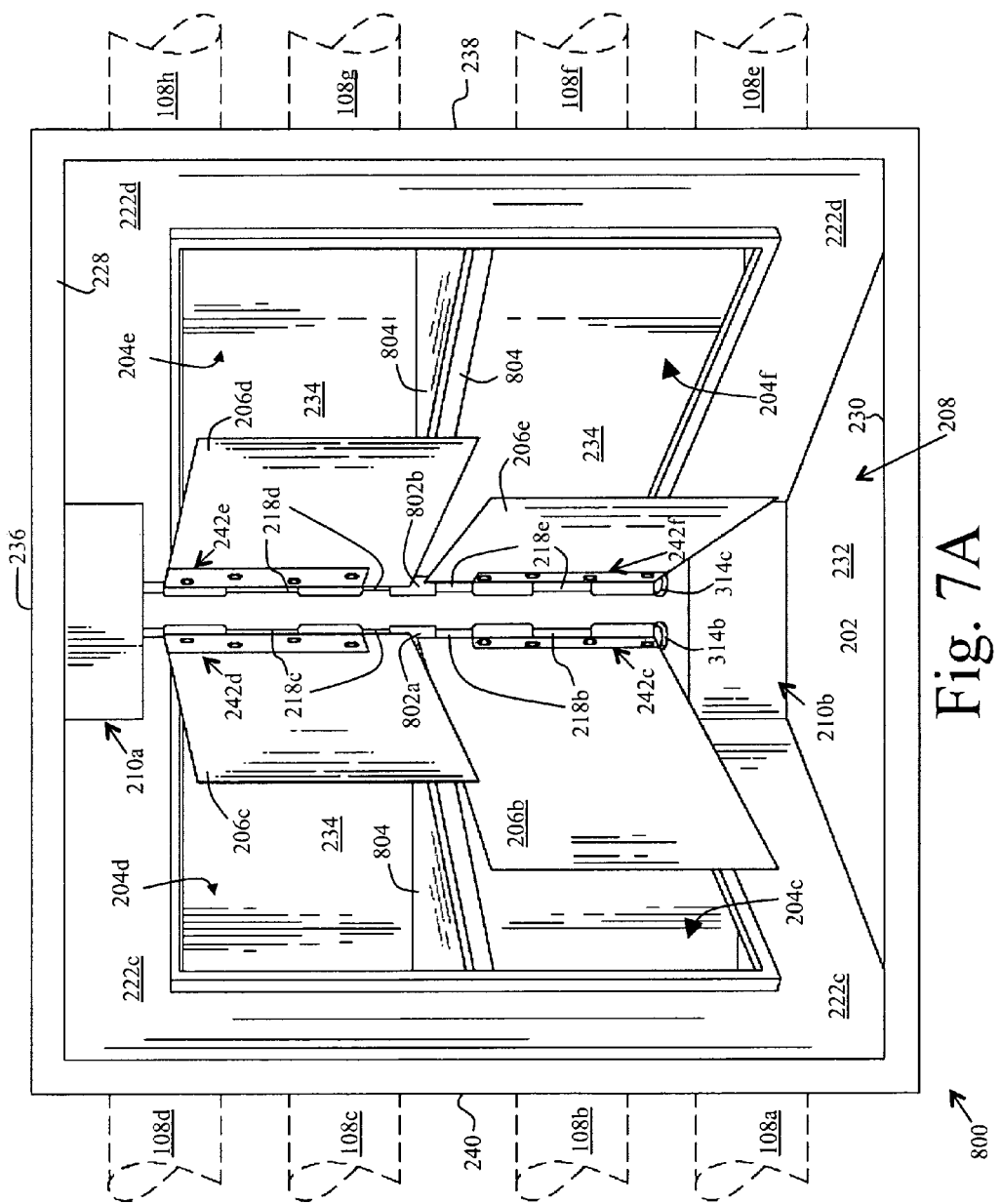

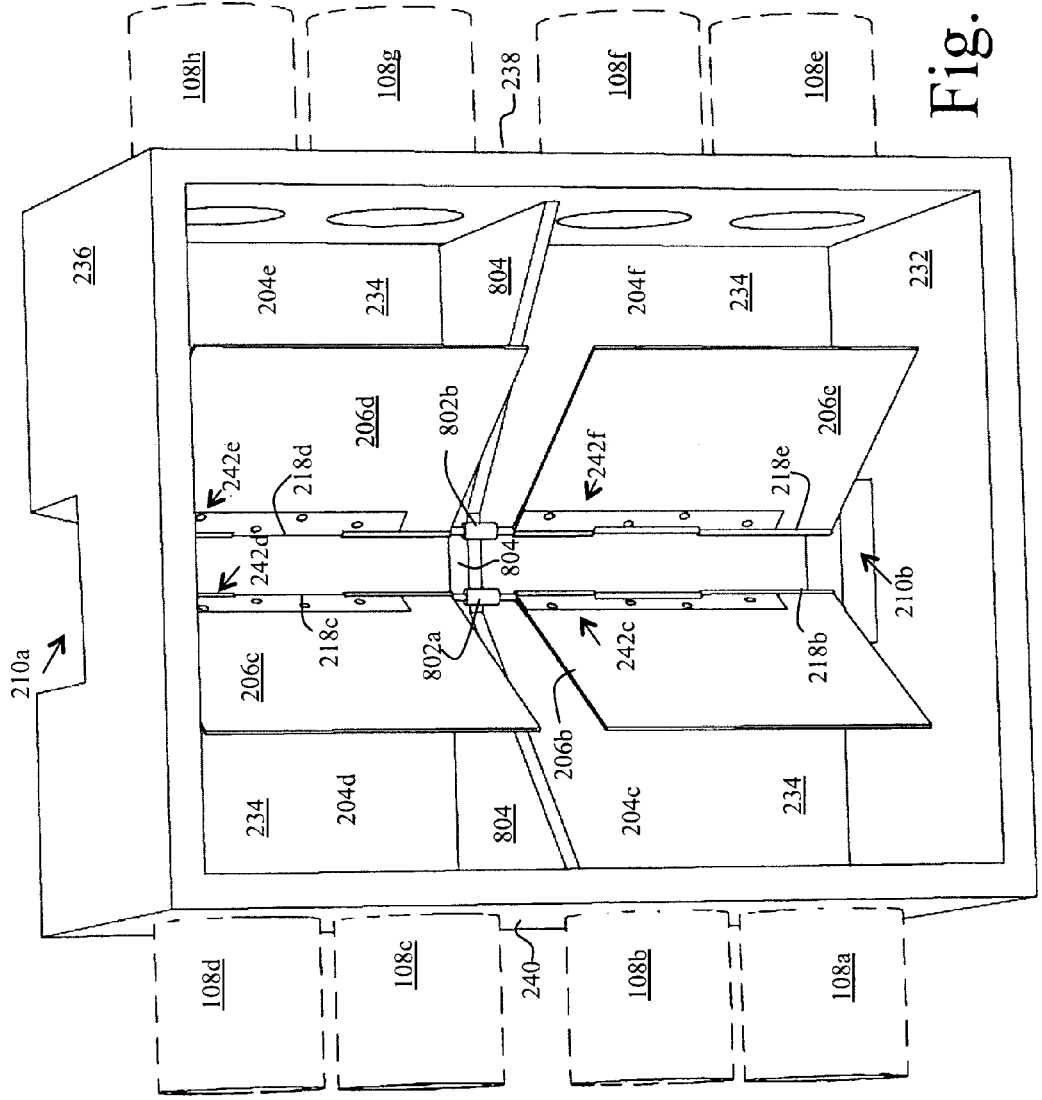

INTEGRATED SELF-CONTAINED PLENUM MODULE

CROSS-REFERENCE TO RELATED APPLICATIONS

This application is a Continuation-In-Part application claiming the benefit of priority of the co-pending U.S. Non-Provisional Utility patent application Ser. No. 13/288,882, with a filing date of 3 Nov. 2011, which claims the benefit of priority of U.S. Provisional Utility Patent Application No. 61/410,300, filed 4 Nov. 2010, the entire disclosures of all Applications are expressly incorporated by reference in their entirety herein. Where a definition or use of a term in the incorporated patent applications is inconsistent or contrary to the definition of that term provided herein, the definition of that term provided herein applies and the definition of that term in the incorporated patent applications does not apply.

BACKGROUND OF THE INVENTION

1. Field of the Invention

The present invention relates to plenums and, more particularly, to an integrated self-contained plenum module used for zoning or economizer systems.

2. Description of Related Art

Conventional plenums for control of flow of air are well known and have been in use for a number of years. A conventional zoning or economizer plenum is generally used for zoning and or recycling of return air control and is comprised of an empty rectangular or cube box with a single ingress hole for flow of air into the plenum and two or more egress holes with corresponding number of associated dampers that enable control of flow of air out of the respective egress holes of plenum. Regrettably, most conventional plenums are complicated and in particular, use complex damper system for control of the flow of air.

Accordingly, in light of the current state of the art and the drawbacks to current conventional zoning or return air systems, a need exists for a plenum that would be simple to manufacture, install, and use for a decentralized, granulated flow control, thereby substantially reducing material, cost, and labor for zoning or economizer systems.

BRIEF SUMMARY OF THE INVENTION

A non-limiting, exemplary aspect of an embodiment of the present invention provides a device, comprising:
a plenum module that includes and incorporates a plenum;
the plenum includes and incorporates within, a compartmentalized interior and one or more diversion damper mechanisms; and
actuator control assembly for driving the diversion damper mechanisms.

Another non-limiting, exemplary aspect of an embodiment of the present invention provides a plenum module, comprising:
a compartmentalized interior.

Yet another non-limiting, exemplary aspect of an embodiment of the present invention provides a plenum, comprising:
an interior space that is compartmentalized into separate chambers defined by at least one wall panel;
the compartmentalized interior includes:
a main ingress opening;
a subordinate space; and
the chambers;

a chamber has one ingress opening that is associated with the wall panel and at least one egress opening on the plenum;
the subordinate space is between the main ingress opening and the chambers to which the subordinate space leads via the ingress openings;
where air flows into the plenum from the main ingress opening and into the subordinate space, moving into one or more chamber via the respective ingress openings of the one or more chambers that is controlled by a gate mechanism, and out of the plenum via the at least one egress opening of the chamber.

Still another non-limiting, exemplary aspect of an embodiment of the present invention provides a control system, comprising:
a motor;
a switch board electrically coupled with the motor; and
a zone control board electrically coupled with the switch board.

A further non-limiting, exemplary aspect of an embodiment of the present invention provides a switching system for motor control, comprising:
a first switch, a second switch, and a diode for selective application of power for driving a bidirectional motor based on received set of actuating signals;
where the bidirectional motor is driven in one of a first, a second, and a third directions.

Yet a further non-limiting, exemplary aspect of an embodiment of the present invention provides a switching system for a bidirectional motor control, comprising:
a first switch;
a second switch; and
a diode;
where the first switch at a second state and the second switch at a first state generate a first signal to drive a motor to a first position;
where the first and second switches at the first state in combination with the diode generate a second signal, which is a half-wave rectified signal to drive the motor to a second position; and
where the first switch at the first state and the second switch at the second state generate a third signal to drive the motor to a third position.

Such stated advantages of the invention are only examples and should not be construed as limiting the present invention. These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" may be used to mean "serving as an example, instance, or illustration," but the absence of the term "exemplary" does not denote a limiting embodiment. Any embodiment described as "exemplary" is not necessarily to be construed as preferred or advantageous over other embodiments. In the drawings, like reference character(s) present corresponding part(s) throughout.

FIGS. 2A to 2D are non-limiting, exemplary illustrations of a plenum module in accordance with an embodiment of the present invention, which progressively illustrate the articulation of a diversion damper mechanism;

FIG. 2E is a non non-limiting, exemplary illustration of a plan view of the plenum module illustrated in FIGS. 1 to 2D in accordance with an embodiment of the present invention.

FIGS. 2G and 2H are non-limiting, exemplary back view illustrations of the plenum module illustrated in FIGS. 1 to 2F in accordance with an embodiment of the present invention;

FIGS. 5A to 5G are non-limiting, exemplary illustrations of various views of a wall panel of the plenum module that is illustrated in FIGS. 1 to 4E in accordance with an embodiment of the present invention;

FIGS. 7A to 7G are non-limiting, exemplary illustrations of a plenum module in accordance with an embodiment of the present invention that includes four chambers.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

In the description given below and the corresponding set of drawing figures, when it is necessary to distinguish the various members, elements, sections/portions, components, or any other aspects (functional, or otherwise) or features of a device(s) or method(s) from each other, the description and the corresponding drawing figures may follow reference numbers with a small alphabet character such as (for example) "chamber 204a, 204b, 204c, 204d, and etc." If the description is common to all of the various members, elements, sections/portions, components, or any other aspects (functional or otherwise) or features of a device (s) or method(s) such as (for example) to all chambers 204a, 204b, 204c, 204d, etc., then they may simply be referred to with reference number only and with no alphabet character such as (for example) "chamber 204."

The present invention provides an integrated, self-contained plenum module that may be used as a zoning plenum or an economizer plenum. Therefore, throughout the disclosure, references to zoning systems or any references to "zone" or "zoning" rather than economizer, return or return systems are meant to be illustrative and for convenience of example only, and should not be limiting.

The present invention provides an integrated, self-contained plenum module that is simple to manufacture, install, and use for a decentralized, granulated flow control, thereby substantially reducing material, cost, and labor for zoning or economizer systems. The integrated, self-contained plenum module also uses less components with simple mechanical controls, which reduce potential for malfunction and contribute to longevity of the entire system.

The integrated, self-contained plenum module of the present invention is comprised of and incorporates a plenum, which, in turn, includes and incorporates within, compartmentalized interior and one or more diversion damper (or a gate) mechanisms, and at least one actuator control assembly for driving the one or more diversion damper (or a gate) mechanisms. The integrated, self-contained plenum module of the present invention may be installed in a vertical, horizontal, inverted, or cross-mounted position.

Figure 1:
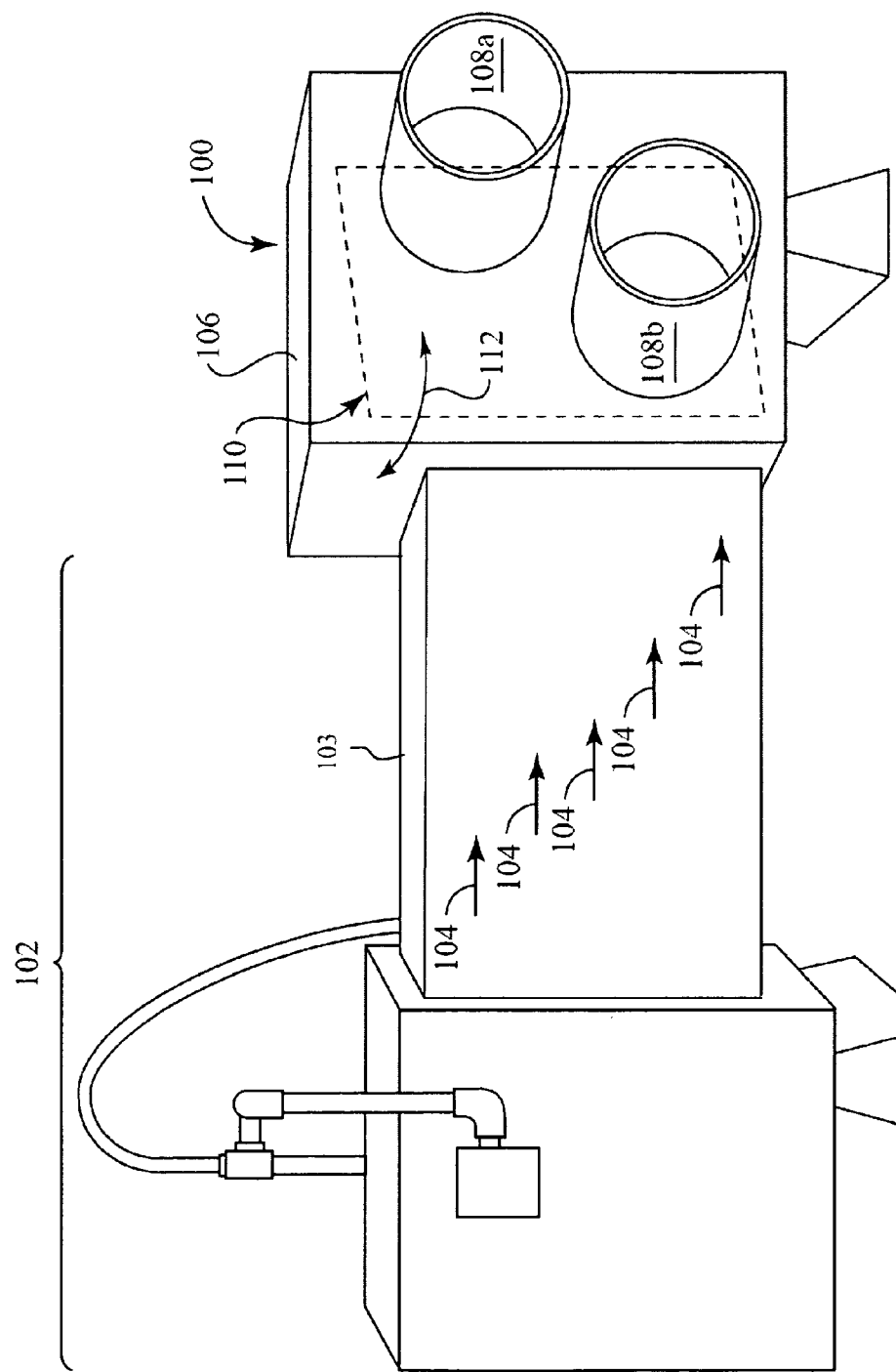
FIG. 1 is a non-limiting exemplary illustration of an embodiment of a plenum module in accordance with the present invention, used with an exemplary conventional Heating Ventilation Air Conditioning (HVAC) system.

FIG. 1 is a non-limiting exemplary illustration of a plenum module 100 in accordance with the present invention, used with an exemplary conventional Heating Ventilation Air Conditioning (HVAC) system 102. As illustrated, conditioned air 104 flows from the HVAC 102 via an HVAC 102 duct connection 103 and into the plenum module 100, where it is distributed via ducts 108 according to a predetermined climate control schemes. In other words, the plenum module 100 of the present invention may be coupled with a single HVAC system 102 with furnace (for heating) and compressor (for cooling) that pumps desired climate controlled air 104 into the plenum module 100 that comprise a plenum 106 that includes and incorporates within, a compartmentalized interior and one or more diversion damper (or a gate) mechanisms 110, and at least one actuator control assembly for driving the diversion damper (or a gate) mechanisms 110 along a reciprocating path 112 to open or close air access to ducts 108.

FIGS. 2A to 2D are non-limiting, exemplary illustrations of a plenum module in accordance with an embodiment of the present invention, which progressively illustrate the articulation of a diversion damper mechanism. As illustrated in FIGS. 2A to 2D, the plenum module 100 of the present invention includes a compartmentalized interior. Accordingly, unlike the conventional plenums that are empty rectangular or cube boxes, the plenum module 100 of the present invention includes an interior space that is compartmentalized, subdivided, and partitioned into separate chambers 204. As progressively illustrated in FIGS. 2A to 2D, the one or more diversion damper (or a gate) mechanisms 110 include damper blades 206 of various configurations that are internally coupled within an interior of the plenum 106 that articulate along the reciprocating path 112 to open or close-off and seal one or more chamber 204.

As further illustrated in FIGS. 2A to 2D, the compartmentalized interior includes a main ingress opening 208 for allowing air into the plenum 106. The compartmentalized interior further includes a subordinate space 202 and interior chambers 204. As illustrated, the subordinate space 202 is between the main ingress opening 208 and the chambers 204 to which the subordinate space 202 leads.

The damper blades 206 (only one single damper blade 206a is required for a two zone system) of the diversion damper mechanism 110 are internally coupled (detailed below) within the interior of the plenum 106 and divert the air to flow to desired interior chamber 204 of the plenum 106. In particular, as illustrated in FIG. 2A, the damper blade 206a is illustrated in a position that has closed-off or sealed chamber 204b (shown on right of the FIG. 2A), leaving the other chamber 204a (to the left of the FIG. 2A) fully open. At this position, all airflow is through the chamber 204a that is fully open.

Figure 2C:
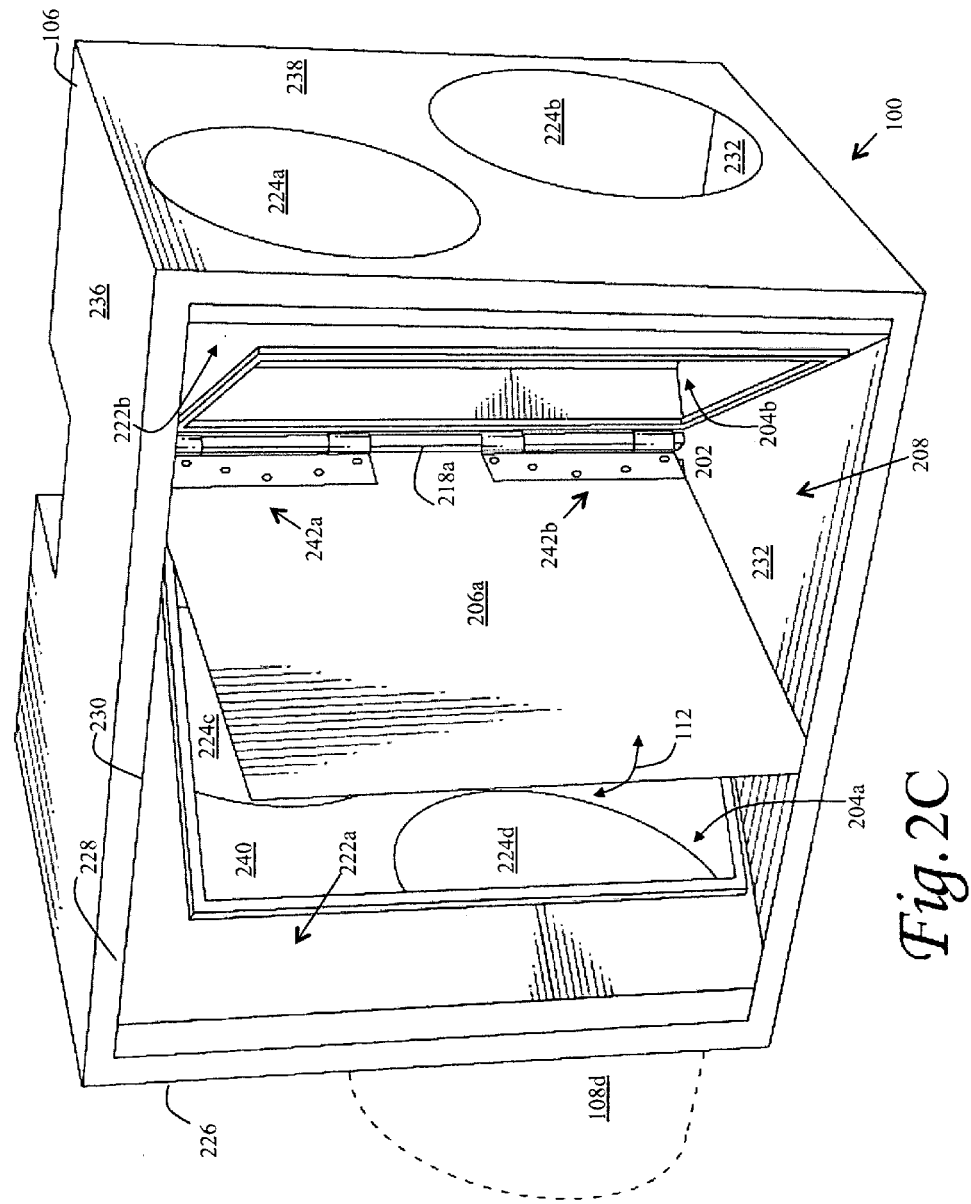
Figure 2D:
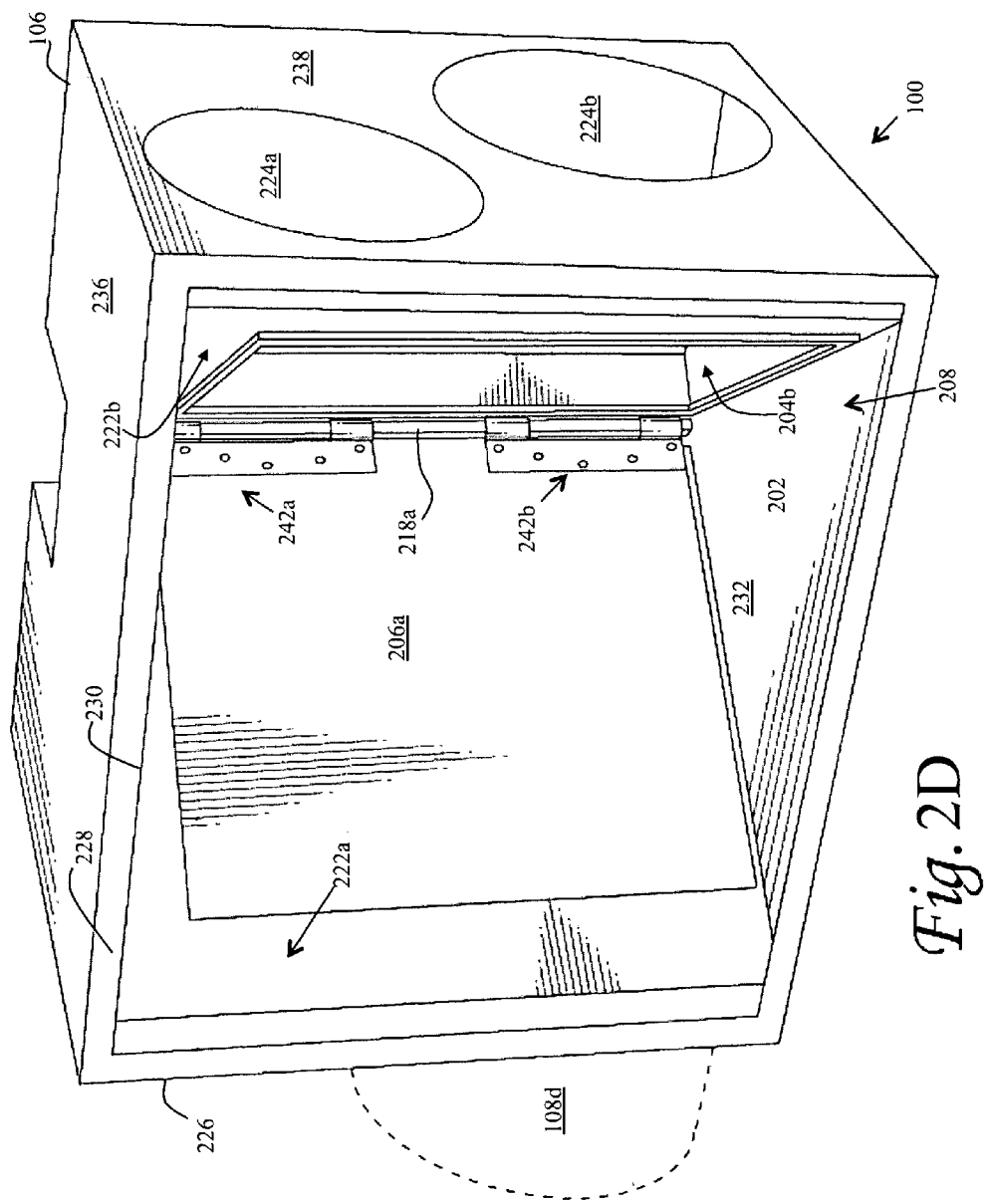

FIGS. 2B and 2C illustrate the damper blade 206a at positions where both chamber 204a and 204b are open. At this position of the damper blade 206a illustrated in FIGS. 2B and 2C, all airflow is through both chamber 204a and 204b. FIG. 2D illustrates the damper blade 206a fully closing-off or sealing the chamber 204a, while leaving fully open the other chamber 204b. At this position of the damper blade 206a illustrated in FIG. 2D, the airflow is through the open chamber 204b illustrated on the right of the FIG. 2D. Accordingly, the damper blades 206 of the diversion damper (or a gate) mechanism 110 are configured to either allow or prevent flow of fluid to pass through the chambers 204 based on the requests from the individual temperature control devices.

Figure 2F:
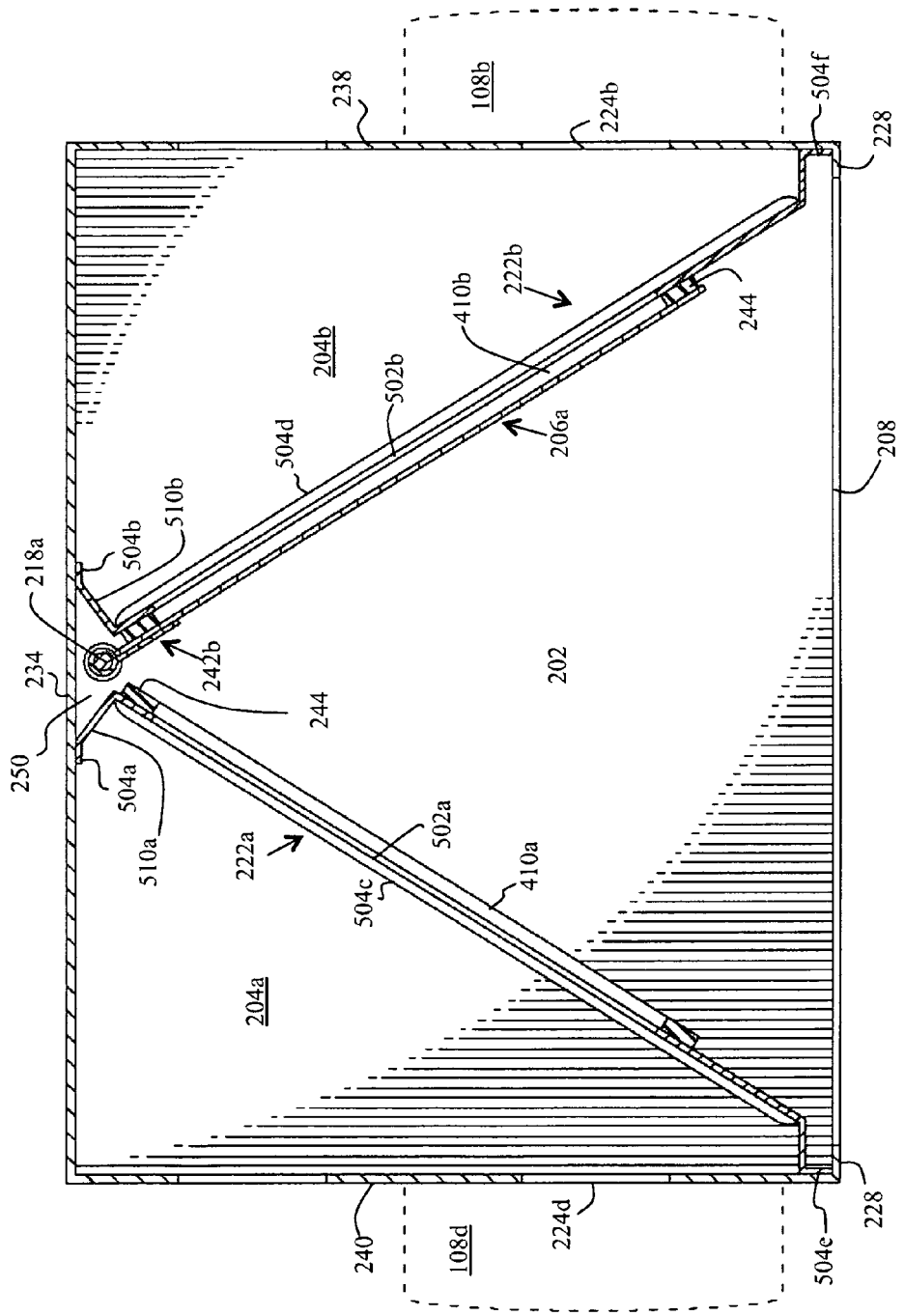
FIG. 2F is a non non-limiting, exemplary illustration of a sectional view of the plenum shown in FIGS. 1 to 2E, which is taken from the plane shown in FIG. 2E.

FIG. 2E is a non non-limiting, exemplary illustration of a plan view of the plenum module illustrated in FIGS. 1 to 2D in accordance with the present invention, and FIG. 2F is a non non-limiting, exemplary illustration of a sectional view of the plenum shown in FIGS. 1 to 2E, which is taken from the plane shown in FIG. 2E. As illustrated in FIGS. 1 to 2F, and FIGS. 2E and 2G in particular, the chambers 204 need not have egress openings 224 on only one or two sides thereof (e.g., the lateral sides 238 and 240 of the plenum 106), but may also additionally include egress openings along the back 234 of the plenum 106. In the exemplary instance shown in FIGS. 2E and 2G, there are only egress openings 224 along the lateral sides 238 and 240 of the plenum 106 for the respective chambers 204b and 204a, but with the plenum module 100 providing markings 246 (FIGS. 2E and 2G) as cutting guides for additional egress openings 224 if desired.

Therefore, as illustrated in FIGS. 1 to 2F, the present invention provides a plenum 106 that is comprised of an interior space that is compartmentalized, subdivided, and partitioned into separate chambers 204 defined by at least one wall panel 222. The compartmentalized interior includes the main ingress opening 208 and the subordinate space 202, including the chambers 204 that have at least one ingress opening 402 (FIG. 4A) that is associated with the wall panel 222 and at least one egress opening 224 on the plenum 106. The subordinate space 202 is between the main ingress opening 208 and the chambers 204 to which the subordinate space 202 leads via the ingress openings 402. The conditioned air 104 flows into the plenum 106 from the main ingress opening 208 and into the subordinate space 202, moving into one or more chamber 204 via the respective ingress openings 402 of the one or more chambers 204 that is controlled by a gate mechanism 110, and out of the plenum 106 via the at least one egress opening 224 of the chamber 204.

As further illustrated in FIGS. 1 to 2F, the plenum 106 further includes the main ingress opening 208 that is defined by a periphery edge 226 of the plenum 106 that has a flange 228 that extends to define a perimeter of the main ingress opening 208, with the flange 228 used for coupling the plenum module 100 with an HVAC system as show in FIG. 1. The subordinate space 202 is defined by the wall panels 222 of the chambers 204 and any of the interior facing surfaces that are exposed to the subordinate space 202 (e.g., the bottom side 232, back side 234, and top side 236 of the interior of the plenum 106). As best illustrated in FIG. 2F, the interior facing sides of the lateral sides 238 and 240, and a major part of the backside 234 are exposed to the interior of the chambers 204 rather than the subordinate space 202 due to the wall panels 222 that define and confine the chambers 204 in relation to the subordinate space 202.

FIGS. 2G and 2H are non-limiting, exemplary illustrations of an exterior back of the plenum module illustrated in FIGS. 1 to 2F in accordance with the present invention. As illustrated in FIGS. 1 to 2H, in the non-limiting exemplary instance illustrated, the plenum module 100 is comprised of an exterior back section that has a recessed cavity 210 of sufficient depth with a cavity floor 214 for accommodating an actuator 216 that drives the damper blades 206 that are coupled with a shaft 218 via hinge mechanisms 242. As best illustrated in FIG. 2H, the actuator 216 is housed within the recessed cavity 210 and coupled with the shaft 218, with the recessed cavity walls 212 providing protection for the actuator 216. In particular, the surrounding periphery walls 212 define the recessed cavity 210, which protect the actuator 216 during shipping and installation of the plenum module 100. It should be noted that the location of the illustrated switchboard 220 (detailed below) is only exemplarily illustrated on the back side 234 of the plenum 106 for clarity and discussion purposes, but can easily be positioned and accommodated with the actuator 216 within the recessed cavity 210.

Figure 3A:
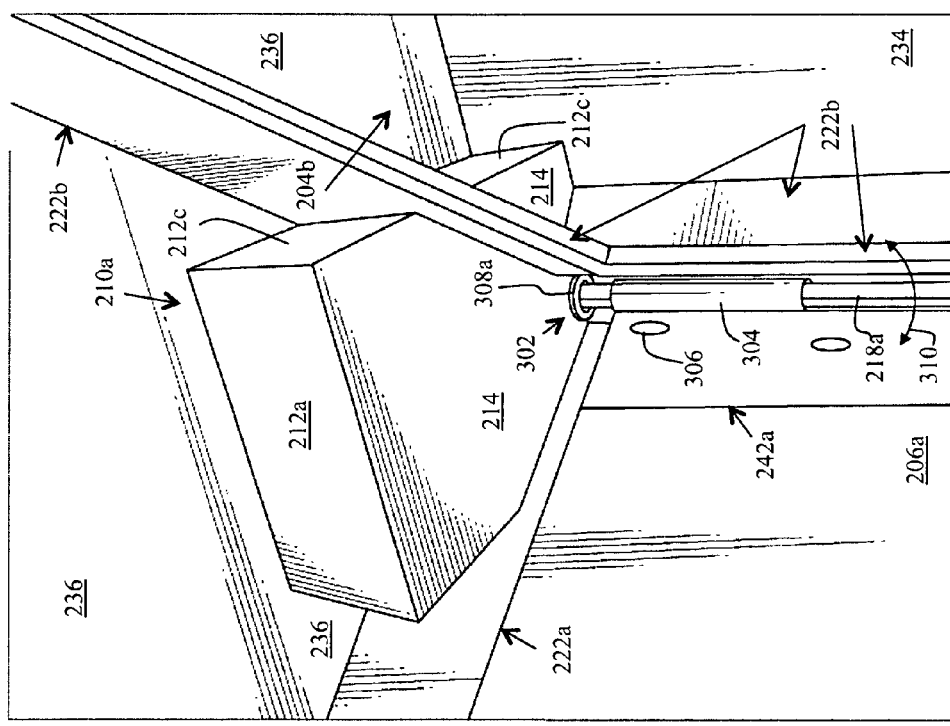
FIG. 3A is a non-limiting exemplary close-up view of an upper section of interior space of the plenum module in accordance with an embodiment of the present invention.
Figure 3B:
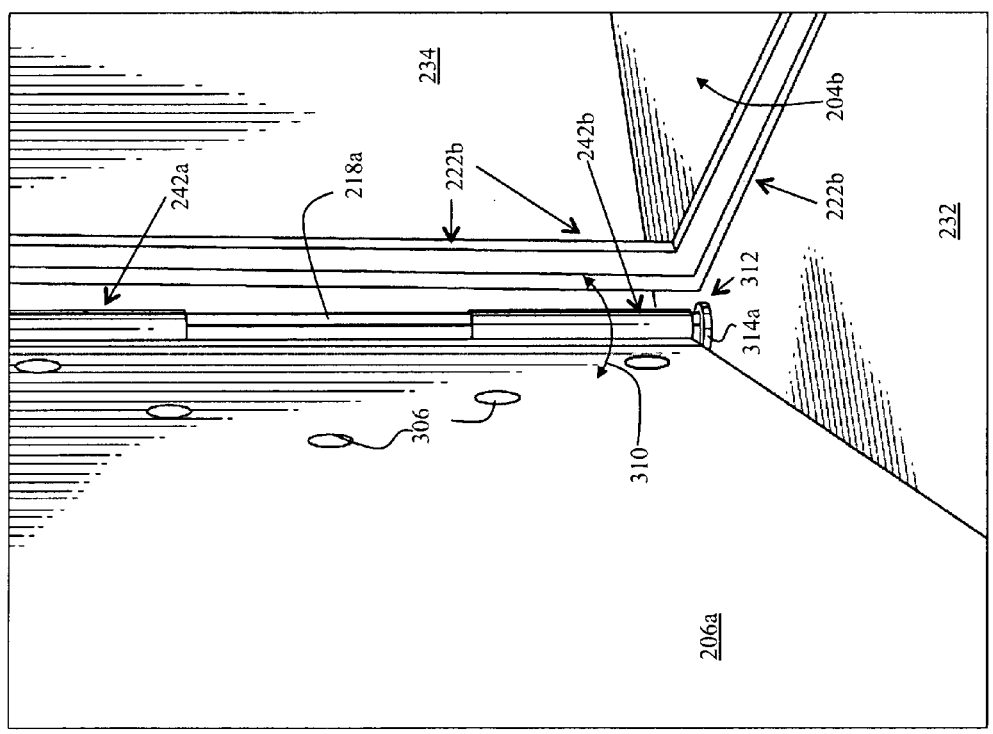
FIG. 3B is a non-limiting exemplary close-up view of a lower section thereof.

FIG. 3A is a non-limiting exemplary close-up view of an upper section of interior space of the plenum module in accordance with the present invention, and FIG. 3B is a non-limiting exemplary close-up view of a lower section thereof. FIG. 3A details the recessed cavity and upper section of the shaft as viewed from within the subordinate space 202 of the plenum 106, and FIG. 3B details a lower section of the shaft as viewed from within the subordinate space 202 of the plenum 106. As illustrated in FIGS. 1 to 3B, and in particular, FIGS. 3A and 3B, the damper blade 206a is exemplarily illustrated as closing off the chamber 204a (also illustrated in FIG. 2D), while the chamber 204b is fully open. As illustrated in FIGS. 2G, 2H, 3A, and 3B, the actuating shaft 218 extends out of the interior space of the plenum 106 and into the outer recessed cavity 210 through the cavity floor 214 through an upper actuator shaft hole 302. The upper actuator shaft hole 302 includes a bushing 308 (FIGS. 2G and 3A) for facilitating the pivoting of the actuating shaft 302 about its axial center (or longitudinal axis). In other words, the actuating shaft 218 is a pivoting shaft that is coupled with the damper blade 206 by the hinge mechanisms 242, enabling the damper blade 206 (detailed below) to rotate or swing to the desired position as the shaft 218 pivots about its longitudinal axis. As further illustrated, the damper blade 206 is coupled with the shaft 218 by the set of hinge mechanisms 242 that move as the shaft 218 pivots about its axial center along the reciprocating path 310, which move the damper blade 206 along the reciprocating path 112 (FIGS. 1, 2B, and 2C).

As further illustrated in FIG. 3B, the actuating shaft 218 extends out of the interior space of the plenum 106 and into the outer surface through the bottom side 232 through a lower actuator shaft hole 312. The lower actuator shaft hole 312 includes a bushing 314 for facilitating the pivoting of the actuating shaft about its axial center (or longitudinal axis).

Figure 4A:
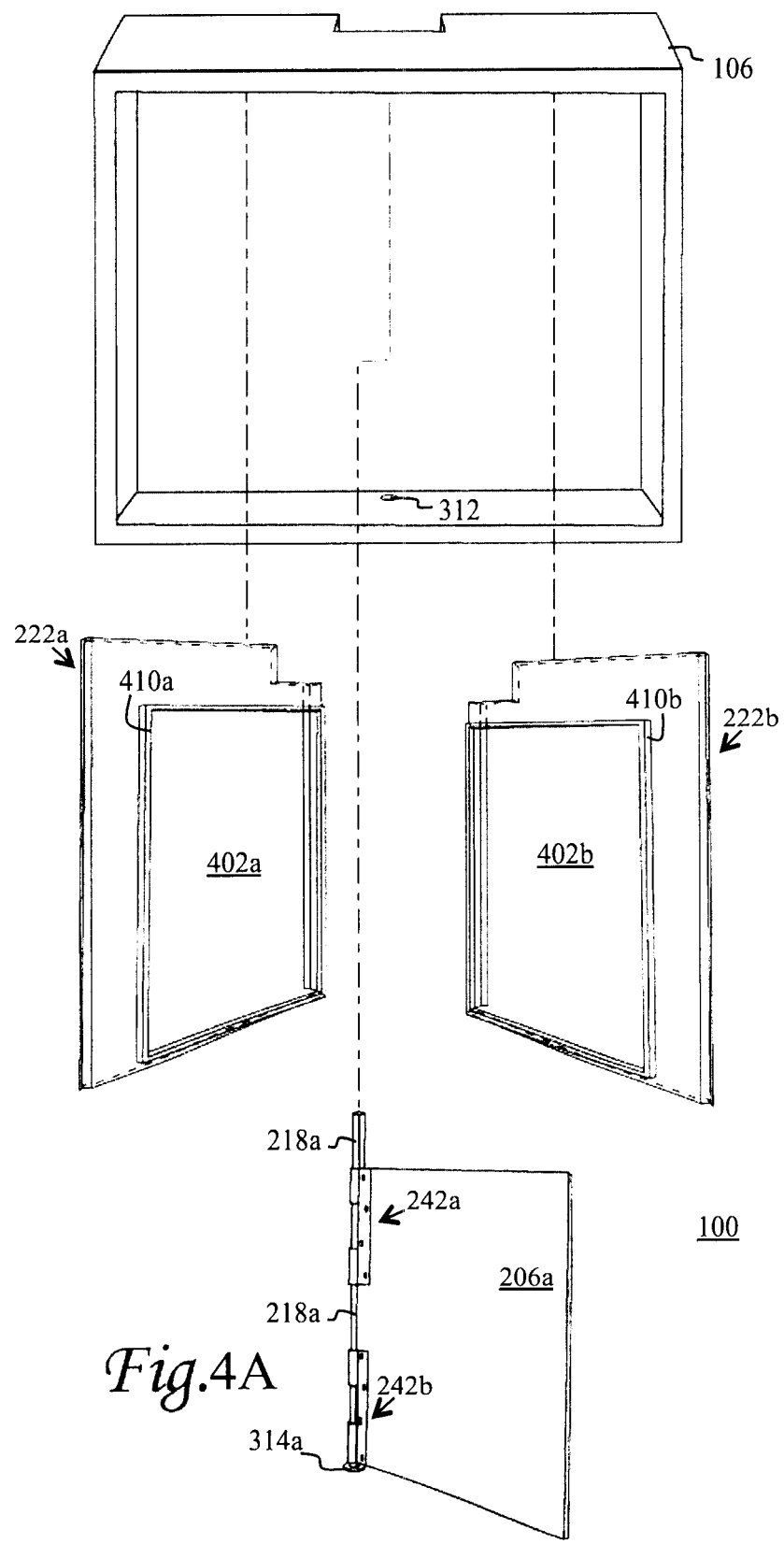
FIG. 4A is a non-limiting, exemplary illustration, showing an exploded view of some of the components of the plenum module in accordance with an embodiment of the present invention, with FIG. 4B detailing the exploded view of the damper blade and shaft, including coupling hinges.

FIG. 4A is a non-limiting, exemplary illustration, showing an exploded view of some of the components of the plenum module in accordance with the present invention, with FIG. 4B detailing the exploded view of the damper blade and shaft, including coupling hinges. As illustrated in FIGS. 1 to 4B, the overall gate mechanism 110 of the present invention requires a damper blade 206, hinges 224, and a shaft 218 with bushings 308 and 314 coupled at the distal ends of the shaft 218. Accordingly, the integrated, self-contained plenum module uses less moving parts and components as compared with conventional systems, and the parts that are used have simple mechanical controls, which reduce potential for malfunction that contribute to longevity of the entire system. As illustrated in FIG. 4B, the shaft 218 is comprised of a single piece unit with a polygonal cross-section that is coupled with the hinge mechanisms 242 of the damper blade 206. The hinge mechanisms 242 are comprised of a set of barrels/knuckles 406 that receive the shaft 218, and a hinge base 408 that couple with a first lateral side 404 of the damper blade 206 via rivets 306.

Figure 4C:
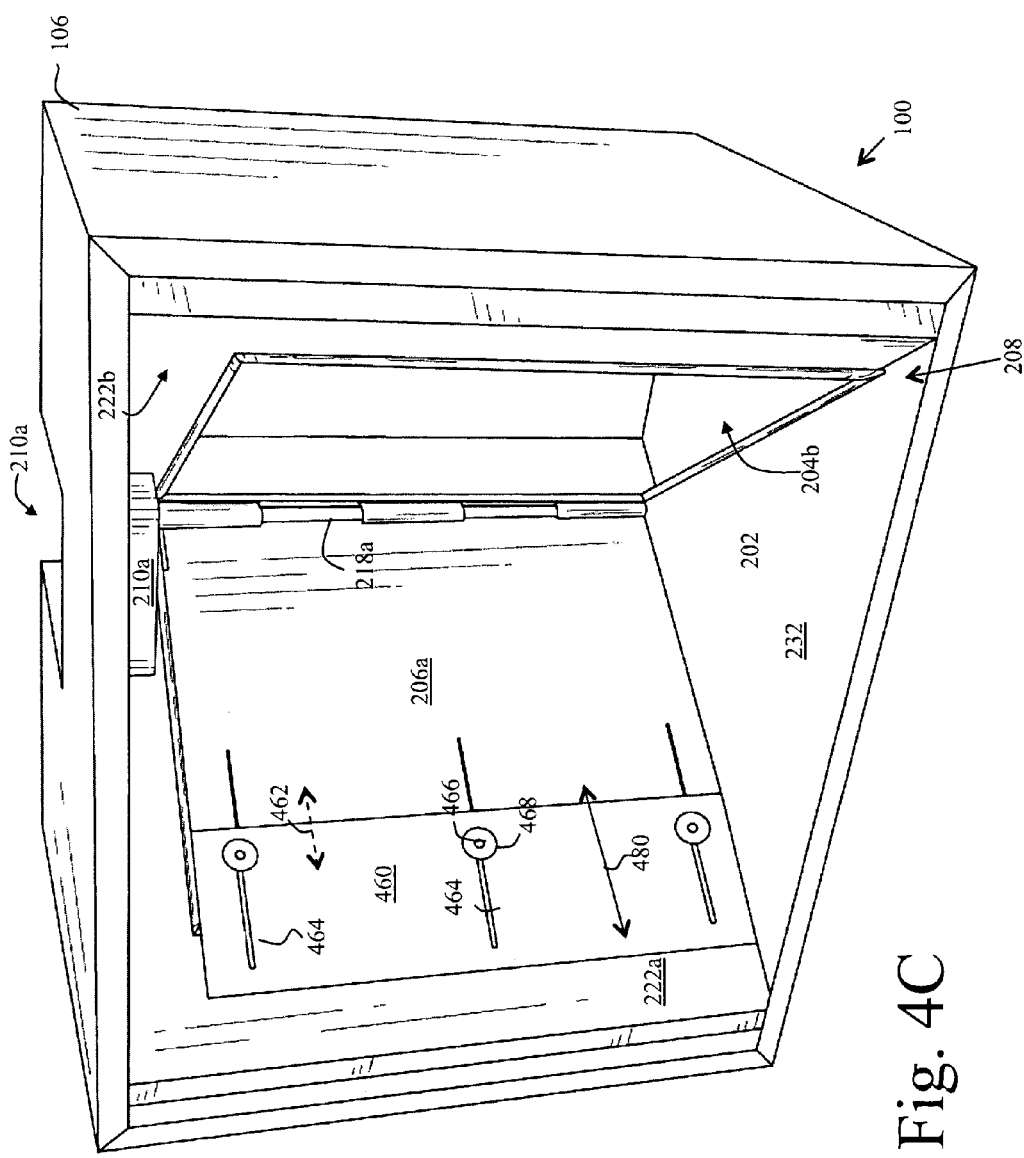
FIG. 4C to 4E are non-limiting, exemplary illustrations detailing another embodiment of a damper blade with an adjustable extension.
Figure 4D:
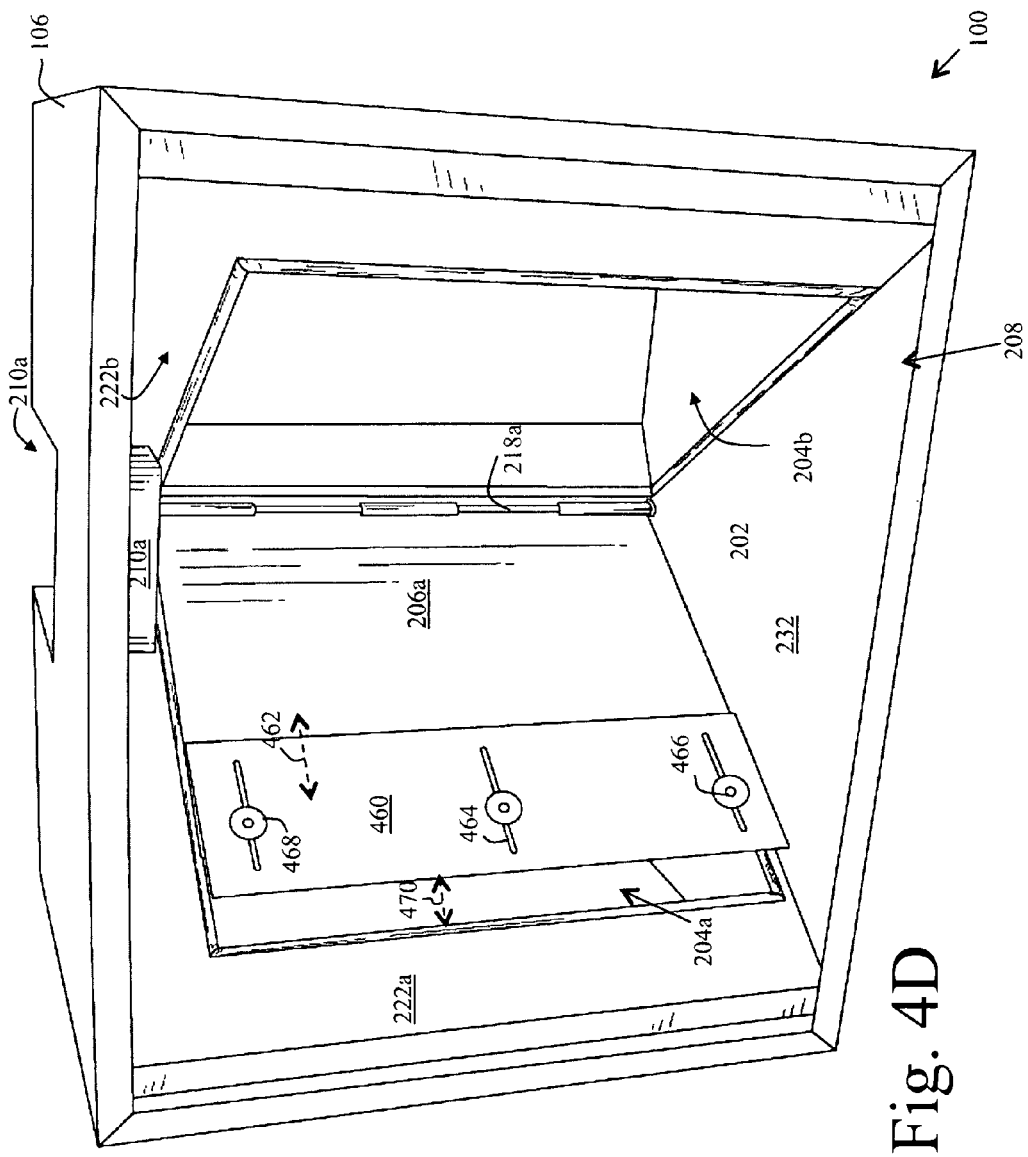
Figure 4E:
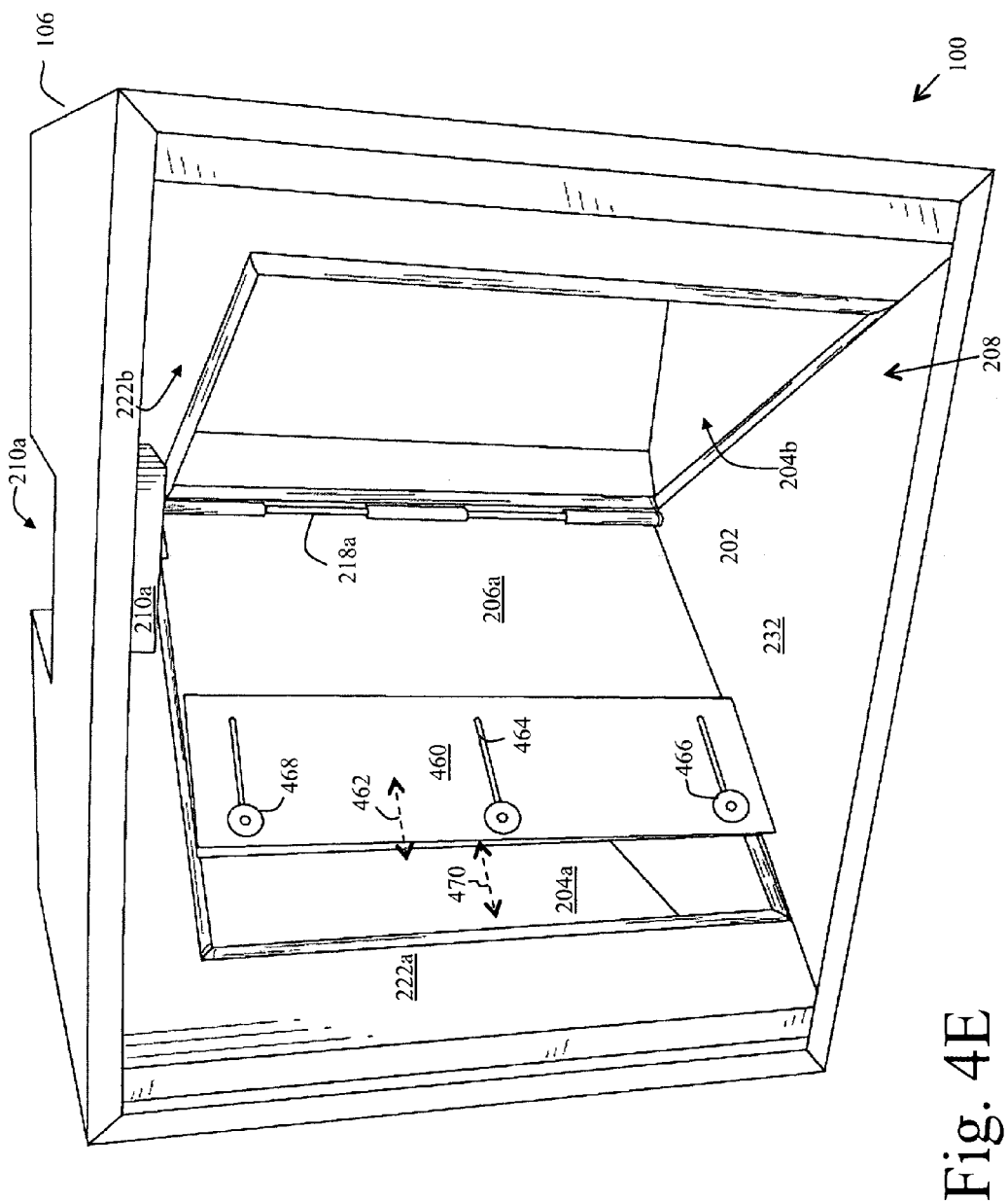

FIG. 4C to 4E are non-limiting, exemplary illustrations detailing another embodiment of a damper blade with an adjustable extension that is illustrated to progressively articulate from a fully closed position (FIG. 4C) to a fully open position (FIG. 4E) in accordance with an embodiment of the present invention. In general, the size and the amount of volume of air per minute delivered by an HVAC system 102 is selected based on the total volume of space for which the HVAC system 102 is to provide conditioned air. For example, and without any limitation, an HVAC system 102 may be selected to provide "X" amount of Cubic Feet per Minute (CFM) of conditioned air for a desired space (e.g., a house with total of "Y" volume of space). However, when dividing a larger space (e.g., "Y" volume of space) into various zones with smaller constituent spaces (e.g., "Y1," "Y2," etc.) using zoning equipment, the amount of CFM generated by the HVAC system 102 and the zoning equipment that handles the CFM of air generated may be out of desired equilibrium, which results in generation of undesirable noise. That is, for example, when closing off a chamber (e.g., 204a), the total space within the plenum 106 that is used to "process" the air is obviously reduced but, the amount of CFM of air generated by the HVAC system 102 and delivered to the plenum 106 is not reduced, resulting in excess air inside the plenum 106, which generate noise. In other words, a greater CFM of air is generated by the HVAC system 102 than can be handled (or "processed") by the plenum 106 when one or more chambers 204 of the plenum 106 are closed, resulting in excess air in the plenum 106.

One method to correct the problem with excess air is to increase the size of the egress openings 224 and the coupled ducts 108 of the chambers 204, while reducing the speed of the fan of the HVAC system 102 to deliver a lower volume of CFM of conditioned air to the plenum 106 for a particular space. These modifications will create substantial equilibrium between the amount of CFM of conditioned air delivered by the HVAC system 102 and the amount of air that can be handled (or "processed") by the plenum 106 for a particular space. However, application of this method with the specialized modifications would mean manufacture of a highly customized plenum module for a particular space, which would obviously increase the costs of manufacturing the plenum 106. For example, zone 1 of a particular space may have a much smaller volume of space than zone 2 and hence, one chamber (e.g., 204a) of the plenum 106 for zone 1 will have one size of egress opening 224a and ducts 108a (to supply "Z" amount of CFM of air) and the other chamber (e.g., 204b) of the same plenum for zone 2 will have different size egress openings 224b and ducts 108b (to supply "N" amount of CFM of air). Accordingly, in order to correct the problem with excess air without customizing the plenum module for any particular application and use, a non-limiting embodiment of the present invention (illustrated in FIGS. 4C to 4E) provides a damper blade 206a with an adjustable extension 460 that functions as a barometric relief damper to "bleed-off" excess air through a "closed-off" chamber of the plenum 106.

As best illustrated in FIGS. 4B to 4E, an embodiment of the present invention includes a damper blade 206 that accommodates an associated adjustable extension 460 that articulates along the reciprocating path 462 on the damper blade 206 to provide an opening 470 to the closed-off chamber (e.g., 204a) to allow excess air to "bleed-off" from the opening 470 into and through the "closed-off" chamber 204a. The amount by which the adjustable extension 460 may be articulated and set along the path 462 to create the desired size opening 470 may be based on the amount of CFM of air generated by the HVAC system 102, the amount of air the plenum 106 can "process" in view of the fully open chamber (e.g., 204b), and the amount of excess air that needs to be removed. Accordingly, the plenum module need not be customized for any particular application, and may be mass produced, with the adjustable extension 460 merely articulated by an installer to a desired position to provide the desired amount of opening 470 to relieve excess air.

As best illustrated in FIG. 4B, in order to provide the desired gap or relieve opening 470, the damper blade 206 may be shortened by a desired amount 476 along its width 452 to a desired position 474. In other words, the new second lateral side of the damper blade 206 will no longer be at 450, but will be one that is indicated by the dashed line 474. Shortening the damper blade 206 along its width 452 will provide the desired opening 470, which may be adjustably covered by the associated adjustable extension 460. It should be noted that the amount 476 by which the damper blade 206 is shortened may be easily compensated by increasing the width 480 of the adjustable extension 460. In other words, any size width for damper blade 206 and or adjustable extension 460 is possible so long as the total combination of the width sizes 452 of the damper blade 206 and width size 480 of the adjustable extension 460 are capable of fully closing-off a chamber as illustrated in FIG. 4C.

As further illustrated in FIGS. 4C to 4E, the adjustable extension 460 is coupled with the damper blade 306 by a set of fasteners 466 that are inserted through a set of washers 468 and slits 464 that are on the adjustable extension 460, with the fasteners 466 held in place and tightened by a set of corresponding number of bolts (not shown). Accordingly, the adjustable extension 460 may be articulated (as a sliding door panel) within its own plane to vary the coverage (or closing) span of the damper blade 206 to provide the desired gap 470 (if any) for bleeding off excess air.

FIGS. 5A to 5G are non-limiting, exemplary illustrations of various views of a wall panel of the plenum module that is illustrated in FIGS. 1 to 4E in accordance with the present invention. As illustrated in FIGS. 1 to 5G, the illustrated wall panels 222 are one of the critical and advantageous reasons that enable the use of lesser number of moving parts with simple mechanical controls for control of air flow, which reduce potential for malfunction and that contribute to longevity of the entire system. The wall panels 222 may be prefabricated and assembled within the plenum 106 to form the chambers 204. In other words, after assembly within the plenum 106, the wall panels 222, and the plenum 106 walls 232, 234, 236, 238, and 240 define the space of each chamber 204 (or the extend or span of the subordinate space 202). As indicated above, the wall panels 222 include at least one ingress opening 402 that include periphery edges 502 that may be covered with a seal 410 for air tight sealing of airflow/ or blocking thereof into the chambers 204. The wall panels 222 include periphery flanges 504 that may be used to couple the wall panels 222 with the interior of the plenum 106 by a variety of methods, a non-limiting example of which may include welding the flanges 504 onto the plenum walls. More specifically (and as best illustrated in FIGS. 2F and 5A to 5G), the flanges 504g and 504h of the respective wall panels 222a and 222b are welded to the interior surface of the top side 236 of the plenum 106, the flanges 504c and 504d of the respective wall panels 222a and 222b are welded to the interior surface of the bottom side 232 of the plenum 106, the flanges 504a and 504b of the respective wall panels 222a and 222b are welded to the interior surface of the back side 234 of the plenum 106, and the flanges 504e and 504f of the respective wall panels 222a and 222b are welded to the interior surface of the respective lateral side 240 and 238 of the plenum 106.

Figure 5A:
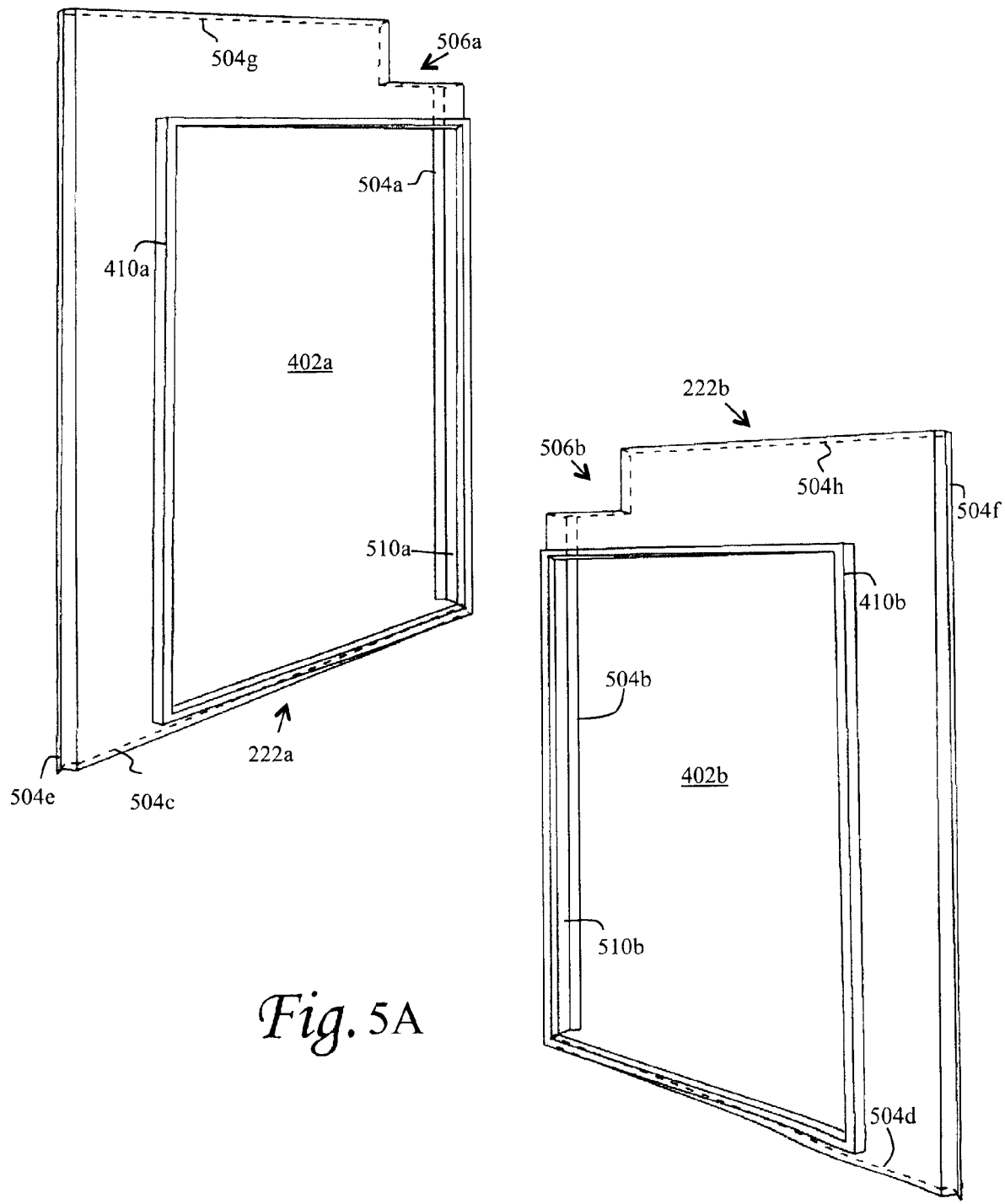
Figure 5C:
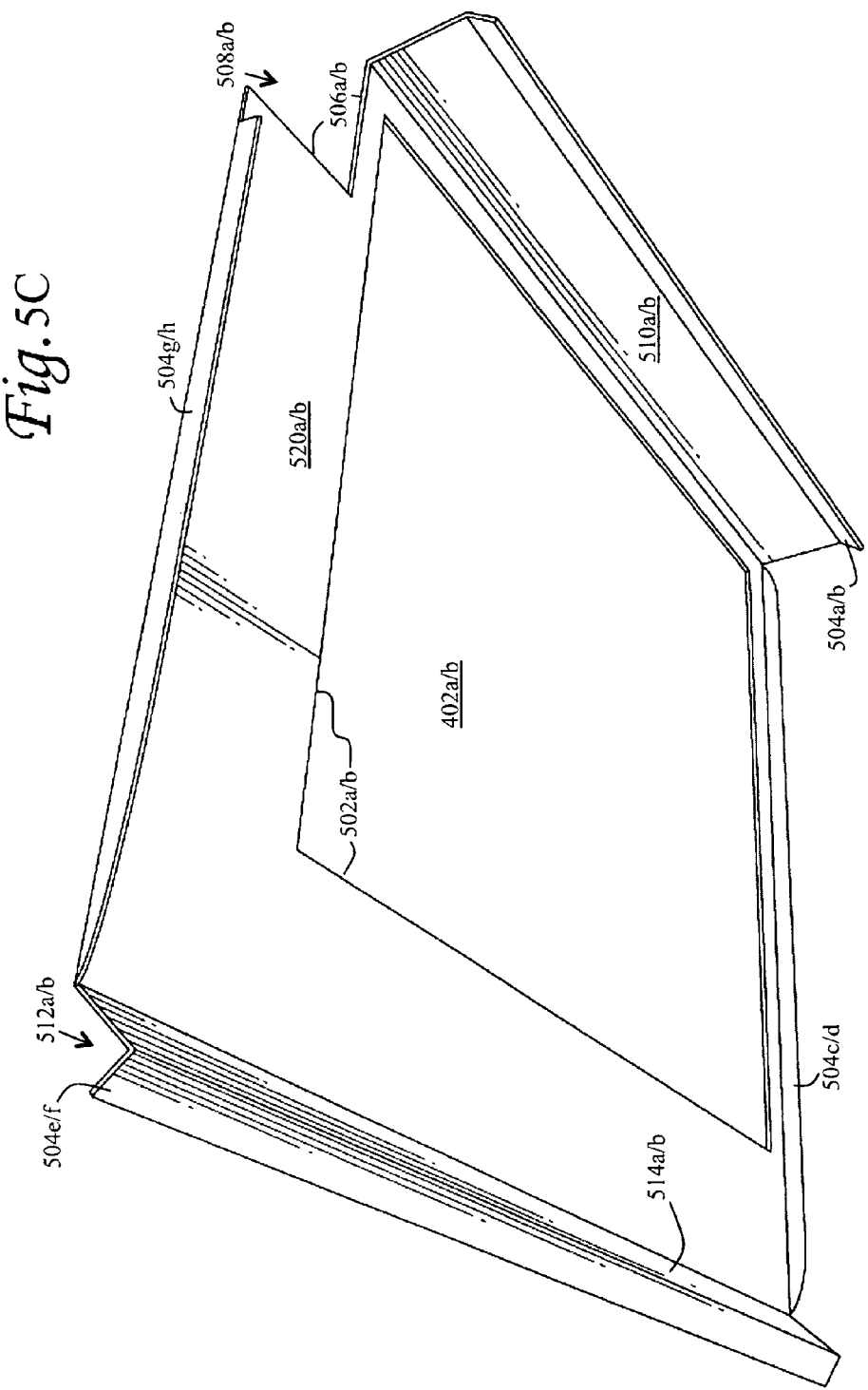
Figure 5D:
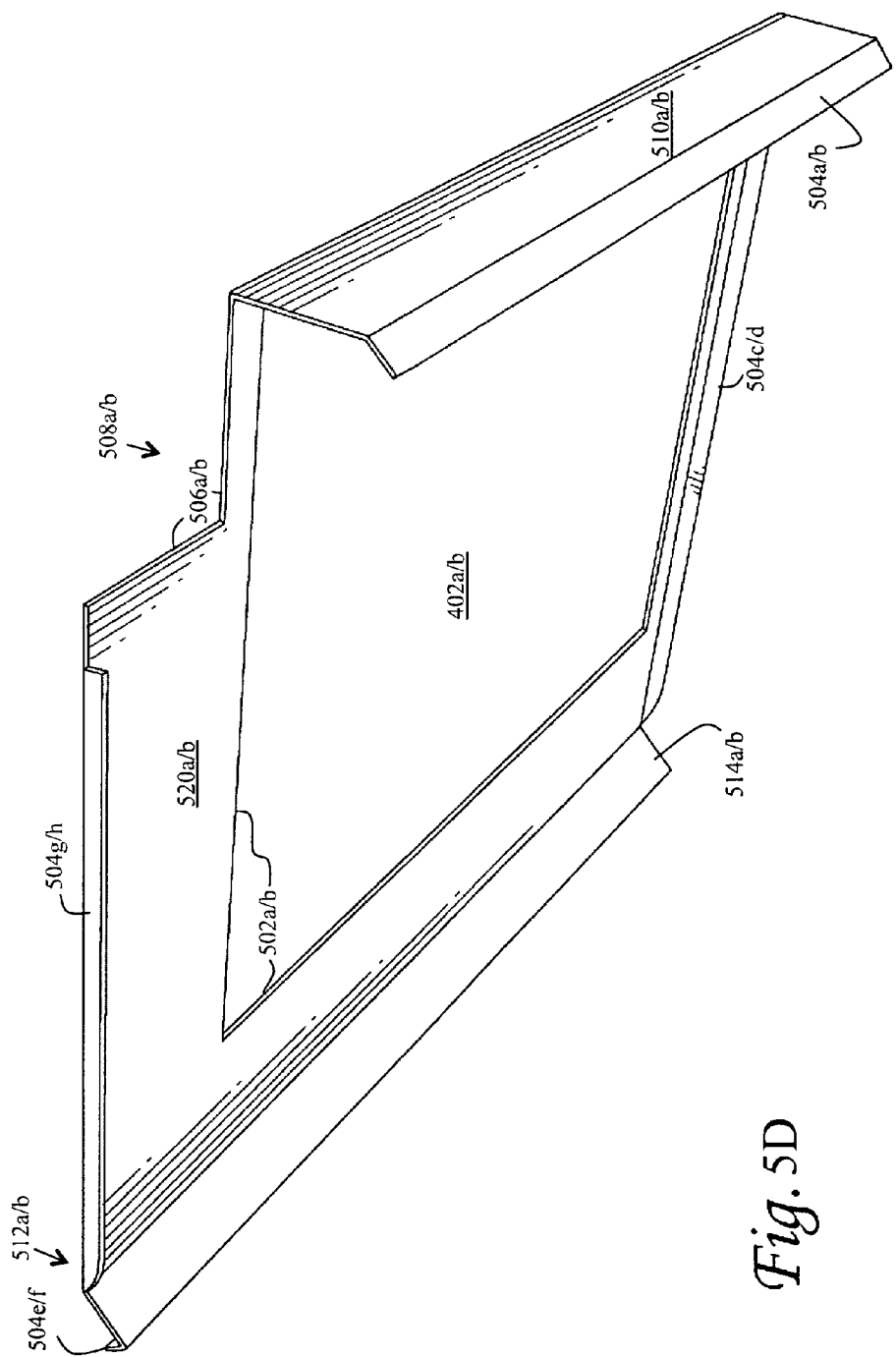
Figure 5E:
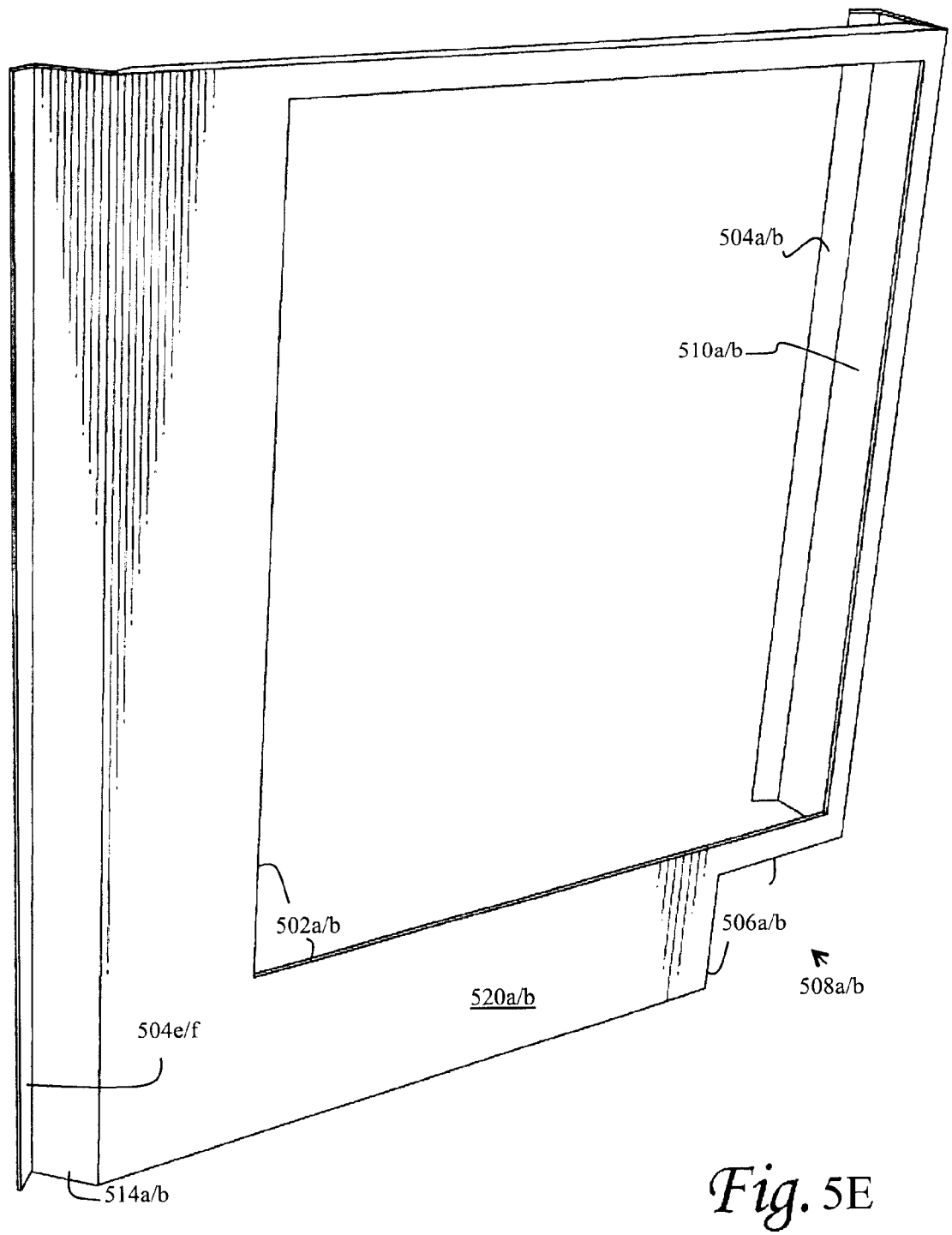

As further illustrated in FIGS. 2F and 5B to 5G (with FIGS. 5B to 5D showing the wall panel views that face the interior of the chambers 204 and the FIGS. 5E to 5G showing the wall panel views facing the subordinate space 202), the wall panels 222 are comprised of a single piece unit that is prefabricated into the illustrated configuration prior to the assembly within the plenum 106. The wall panels 222 include a cutout section 506 at a top backend 508, and a back bent section 510 that accommodate the recessed cavity 210a. In other words, the cutout section 506 and the back bent 510 provide a space 250 (FIG. 2F) needed to accommodate the recessed cavity 210a within the interior of the plenum 106. The frontend 512 of the wall panel 222 includes a front bent section 514 and the flange 504 (504e and 504f). As indicated above, the flanges 504e and 504f are used to connect the wall panel 222 to the respective lateral sides 240 and 238 of the plenum 106. The front bent 514 and the back bent 510 have sufficient span 516 and 518 (respectively) to enable main body 520 of the wall panel 222 and in particular, the opening 402 with the periphery 502 to be substantially in-line and parallel with the damper blade 206 (best illustrated in FIG. 2F) so to facilitate proper closure of the damper blade against the opening 402.

Figure 6:
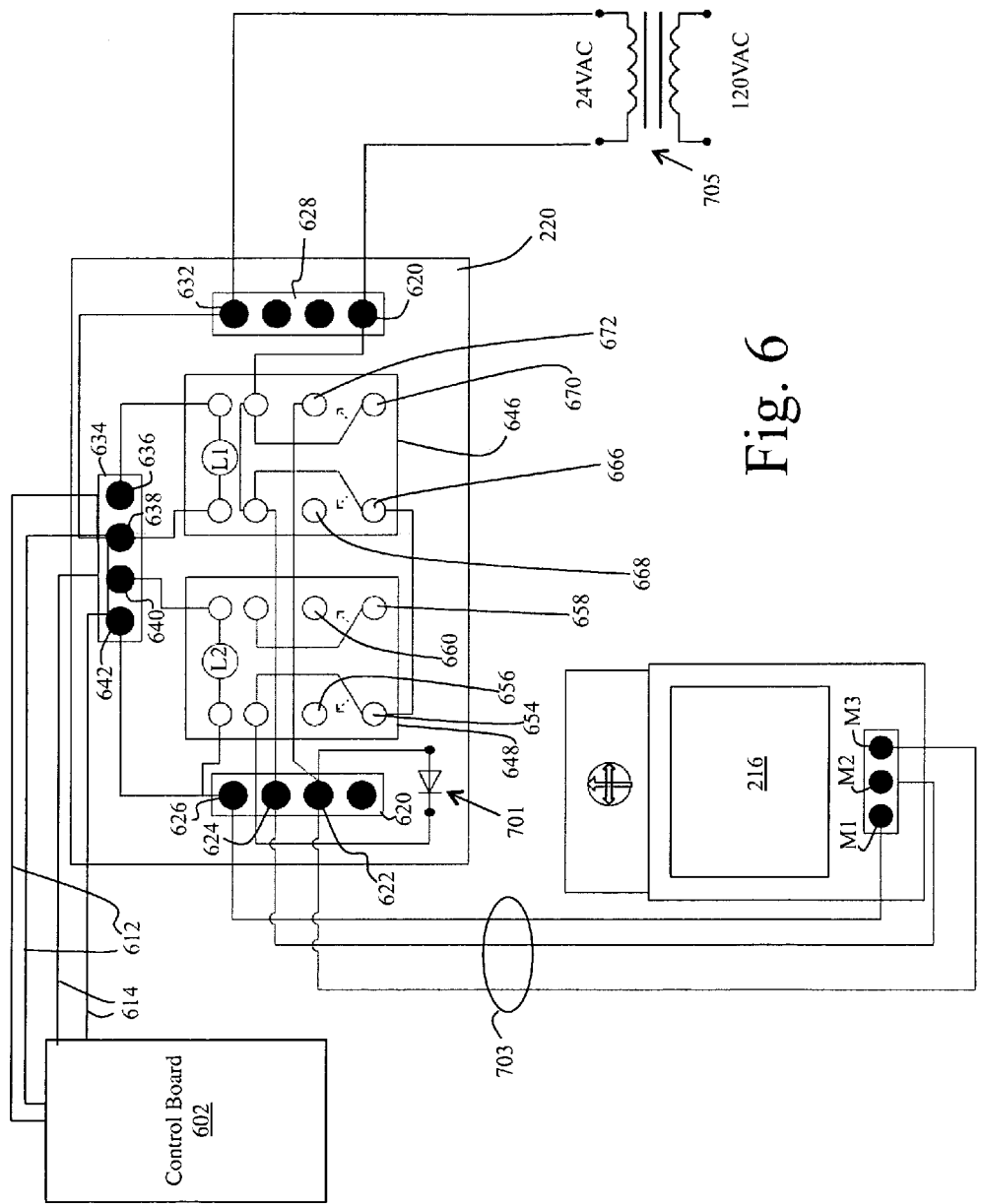
FIG. 6 is a non-limiting, exemplary illustration of the electronics used to control one or more actuators that articulate one or more dampers in accordance with an embodiment of the present invention.

FIG. 6 is a non-limiting, exemplary illustration of the electronics used to control one or more actuators that articulate one or more dampers in accordance with an embodiment of the present invention. As illustrated in FIGS. 1 to 6, the present invention provides a control system, comprising a motor 216, a switch board 220 electrically coupled with the motor 216, and a very well known, conventional zone control board 602 electrically coupled with the switch board 220. As illustrated, the motor 216 is a bi-directional motor (has two windings) that includes a shaft coupler 606 (FIG. 2H) that enable the motor 216 to be coupled with the shaft 218. The switching board 220 receives control signals via its control terminal block 634 from the zone control board 602 to activate the motor 216 in accordance with the control signals. The control signals from the switch board 220 are output by a set of switches 646 and 648, which may comprise of MOSFETs, relays, or the like.

The conventional zone control board 602 includes circuitry that receives multiple input signals from climate control sensors and outputs multiple control signals to devices to affect temperature change. The zone output singles 612 and 614 from the conventional zone control board 602 for a two zone system are generally intended to activate two separate motors and hence, the reason for the use of the switch board 220 of the present invention. That is, instead of using two separate motors to be compatible with the zone output signals 612 and 614 from the conventional zone control board 602, the present invention provides the "adapter" circuit 220 to enable the conventional zone control board 602 signals 612 and 614 intended for two separate motors to communicate with only a single motor with two windings. Further, the switchboard circuit 220 also enables a two-position motor 216 to function as a three-position motor (right-center-left). Accordingly, the switchboard 220 enables the use of a single motor with two windings that functions as if two separate motors are used. Further, the switchboard 220 enables the articulation of the damper blade 602 to at least three positions of the left, right, and center by using its onboard switches that provide power to a single motor while using a conventional zone control board 602.

FIG. 6 details the circuit topography of the switching system of the switching board 220 in accordance with the present invention. As illustrated, the switching system of the switching board 220 is comprised of a first switch 646, a second switch 648, and a diode 701 for selective application of power (supplied via the illustrated stepped down transformer 705) for driving the bidirectional motor 216 based on received set of control signals 612 and 614, where the bidirectional motor 216 is driven in one of a first, a second, and a third directions. A power terminal block 628 receives power (e.g., 24 VAC) from the transformer 705 (e.g., a step down transformer coupled to 120 VAC external power). The power terminal block 628 is comprised of a first power terminal 620 coupled with a power line of the transformer 705, and a second power terminal 632 coupled with common of the transformer 705.

The motor 216 may be driven in the first direction to actuate to a first position, in the second direction to actuate to a second position, and in the third direction to actuate to a third position, with the first and third positions having opposite orientations and the second position being in between the first and third positions. It should be noted that regardless of position of the actuation, the motor constantly receives power and is constantly driven, but is maintained at desired first, second, or third positions based on control signals (e.g., 612, 614) and due to the use of the diode (detailed below). As illustrated in FIG. 6, the switching system includes a control terminal bock 634 that receives the control signals 612 and 614 from the control module (or control board) 602.

The control terminal block 634 includes a first pair of control terminals that receive and output the first control signal 612 from the control board 602, and a second pair of control terminal that receive and output the second control signal 614 from the control board 602. The first pair of control terminal is comprised of a first control signal terminal 636 and a first control common terminal 638, and the second pair of control terminals is comprised of a second control signal terminal 640 and a second control common terminal 642.

The set of actuating signals are output from an actuating terminal block 620 for actuating the motor 216. The actuating terminal block 620 includes a first actuating terminal 626 that is coupled with a first motor terminal M3 (e.g., common). The terminal block 620 also includes a second actuating terminal 624 that is coupled with a second motor terminal M2 (power or positive terminal), with a third actuating terminal 622 of the actuating terminal block 620 coupled with a third motor terminal M1 (power or negative terminal). The combination of outputs from a first, a second, and a third actuating terminals 626, 624, and 622 constitutes one of the first, second, and third actuating signals on the line 703 (detailed below).

The set of actuating signals on the actuating signal lines 703 include the first actuating signal (e.g., for zone 1) for actuating the motor to the first position (e.g., left, to move damper blade to left). The set of actuating signals further include the second actuating signal (where no zone is active) for actuating the motor to the second position (center, where both chambers 204a and 204b are open), and the third actuating signal (e.g., for zone 2) for actuating the motor to the third position (e.g., right, to move the damper blade to right).

The first actuating signal (e.g., zone 1) for actuating the motor to the first position (e.g., left) is generated as a result of the first switch 646 changing from a first state (as illustrated in FIG. 6) to a second state, with the second switch 648 remaining at the first state (shown in FIG. 6). The first state of a switch (e.g., 646 and or 648) may be defined as a "default" or "de-energized" state of the switch, which is shown in FIG. 6. That is, the inductor coil L (e.g., coils L1 and or L2) is de-energized (no current through the coil L) to move the illustrated relay arms in the direction of the arrows indicated in FIG. 6 to change contacts. When the inductor coil L is energized, the magnetic force generated as a result pulls the relay arms in the direction of the arrows shown in FIG. 6 to change the switch state from the first state (which is the default state shown in FIG. 6) to a second state, where the relay arms of the switch disengage from the lower illustrated contacts (e.g., 666/670 and 654/658) illustrated and come into contact with the next set of respective contacts (e.g., 668/672 and 656/660).

In fact, the first actuating signal (e.g., zone 1) for actuating the motor to the first position (e.g., left) is generated as a result of a first control signal (e.g., 612) from a control board 602, which changes a state of the first switch 646 from a first state (as shown in FIG. 6) to a second state (where the relay arms of the first switch move to engage with contacts 668 and 672), with the second switch 648 remaining at the first state as the coil L2 is not energized. That is, the presents of control signal 612 on the control terminals 636 and 638 of the control terminal block 634 generates a current through the coil L1, with the energized coil L1 moving the relay arms of the switch 646 to change the state of the first switch 646 from the illustrated first state to a second state (the relay arms contact the switch contacts 668 and 672. This generates the first actuating signal on the actuating signal lines 703 to actuate the motor to move the shaft 218*a* to move the damper blade 206*a*.

The second actuating signal (no zone or both zones) for actuating the motor to the second position (e.g., center) is generated as a result of the first switch and the second switch remaining at a first state (as shown in FIG. 6). The second actuating signal for actuating the motor to the second position (e.g., center) is generated as a result of both the first and the second switch 646 and 648 being at the first state with no control signal from a control module or board 602 to energize the switches 646 and 648 and change switch state, with power of the second actuating signal half-wave rectified (a signal negative with respect to motor common terminal M3) by the diode 701, which actuates and causes the motor to seek and maintains a center position.

The third actuating signal (e.g., zone 2) for actuating the motor to the third position (e.g., right) is generated as a result of the second switch 648 changing from a first state (illustrated in FIG. 6) to a second state, with the first switch 646 at the first state (illustrated in FIG. 6). In fact, the third actuating signal for actuating the motor to the third position is generated as a result of a second control signal (e.g., 614) from a control board or module 602 changing a state of the second switch 648 from the first state to a second state, with the first switch 646 at the first state. That is, the presents of control signal 614 on the control terminals 640 and 642 of the control terminal block 634 generates a current through the coil L2, with the energized coil L2 moving the relay arms of the switch 648 to change the state of the second switch 648 from the illustrated first state to a second state (the relay arms contact the switch contacts 656 and 650. This generates the third actuating signal on the actuating signal lines 703 to actuate the motor to move the shaft 218 to move the damper blade 206. Therefore the motor 216 actuates the shaft 218 in accordance with the following actuating signal table 1:

TABLE 1

| Motor Terminal | First Actuating Signal (Left) | Second Actuating Signal (Center) | Third Actuating Signal (Right) |
|---|---|---|---|
| M1-M2 | 27 V | 27 V | 27 V |
| M1-M3 | 27 V | 15 V | 0 V |
| M2-M3 | 0 V | 15 V | 27 V |

FIGS. 7A to 7G are non-limiting, exemplary illustrations of a plenum module in accordance with an embodiment of the present invention that includes four chambers. The device 800 illustrated in FIGS. 7A to 7G includes similar corresponding or equivalent components, interconnections, functional, and or cooperative relationships as the device 100 that is shown in FIGS. 1 to 6, and described above. Therefore, for the sake of brevity, clarity, convenience, and to avoid duplication, the general description of FIGS. 7A to 7G will not repeat every corresponding or equivalent component, interconnections, functional, and or cooperative relationships that has already been described above in relation to device 100 that is shown in FIGS. 1 to 6.

Figure 7B:
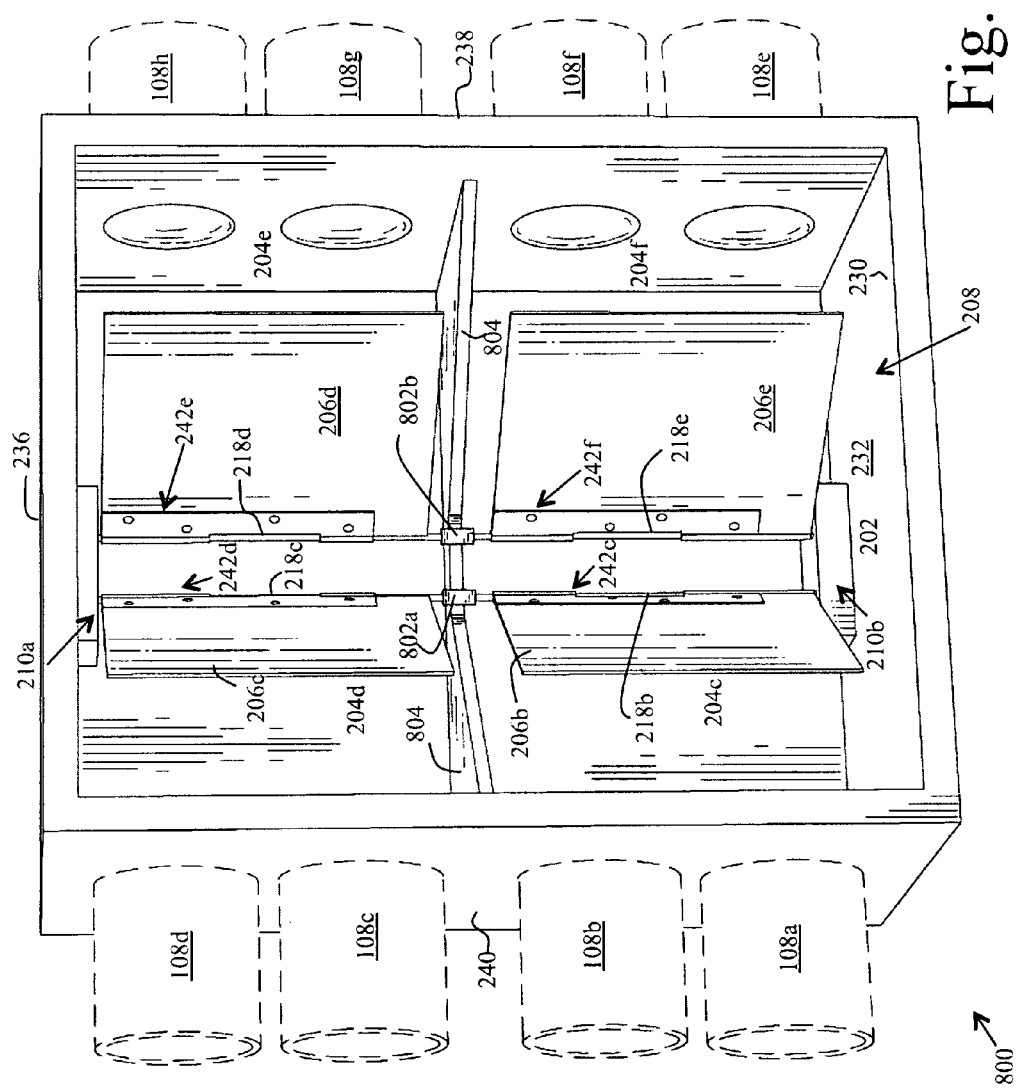
Figure 7D:
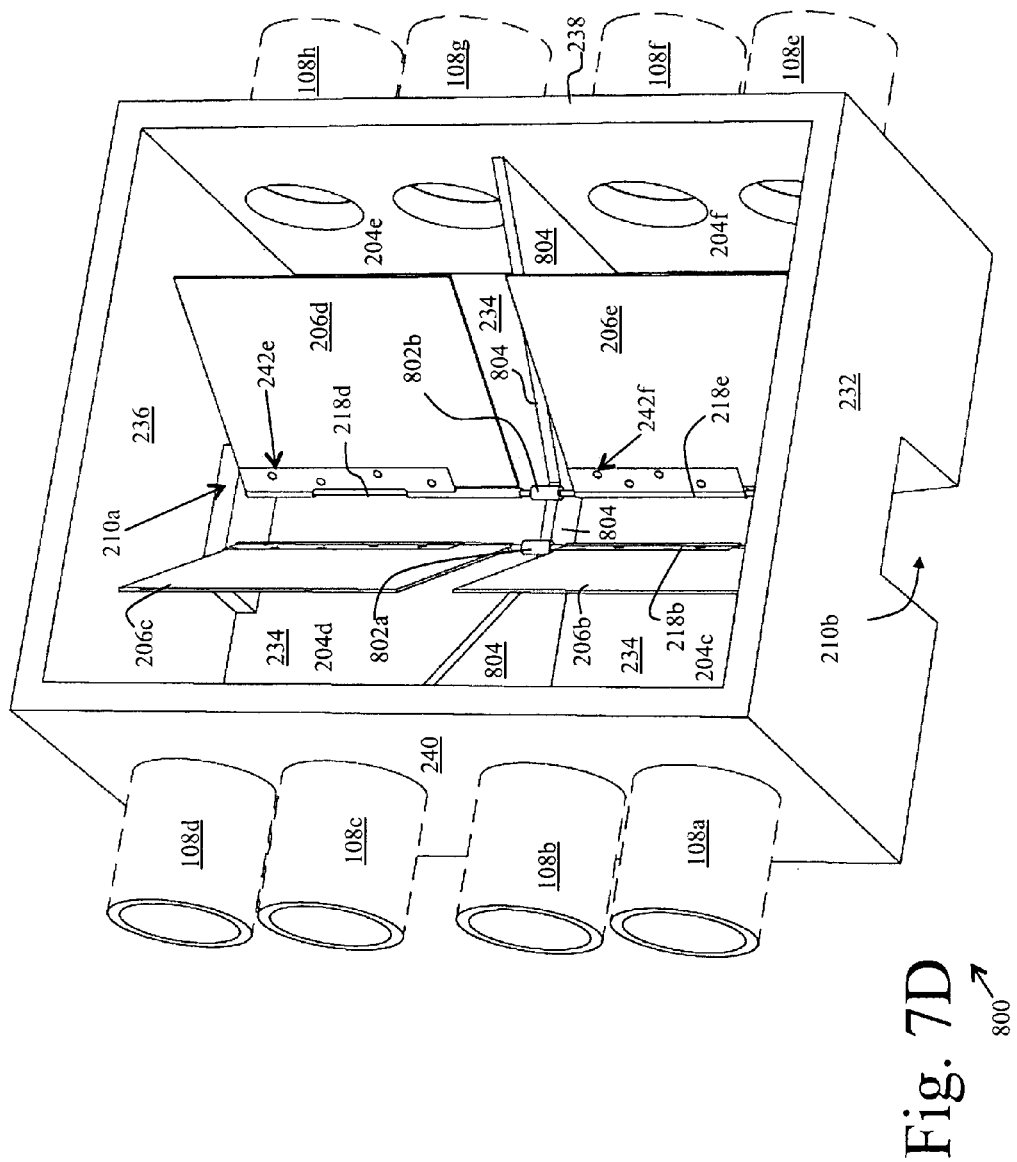
Figure 7E:
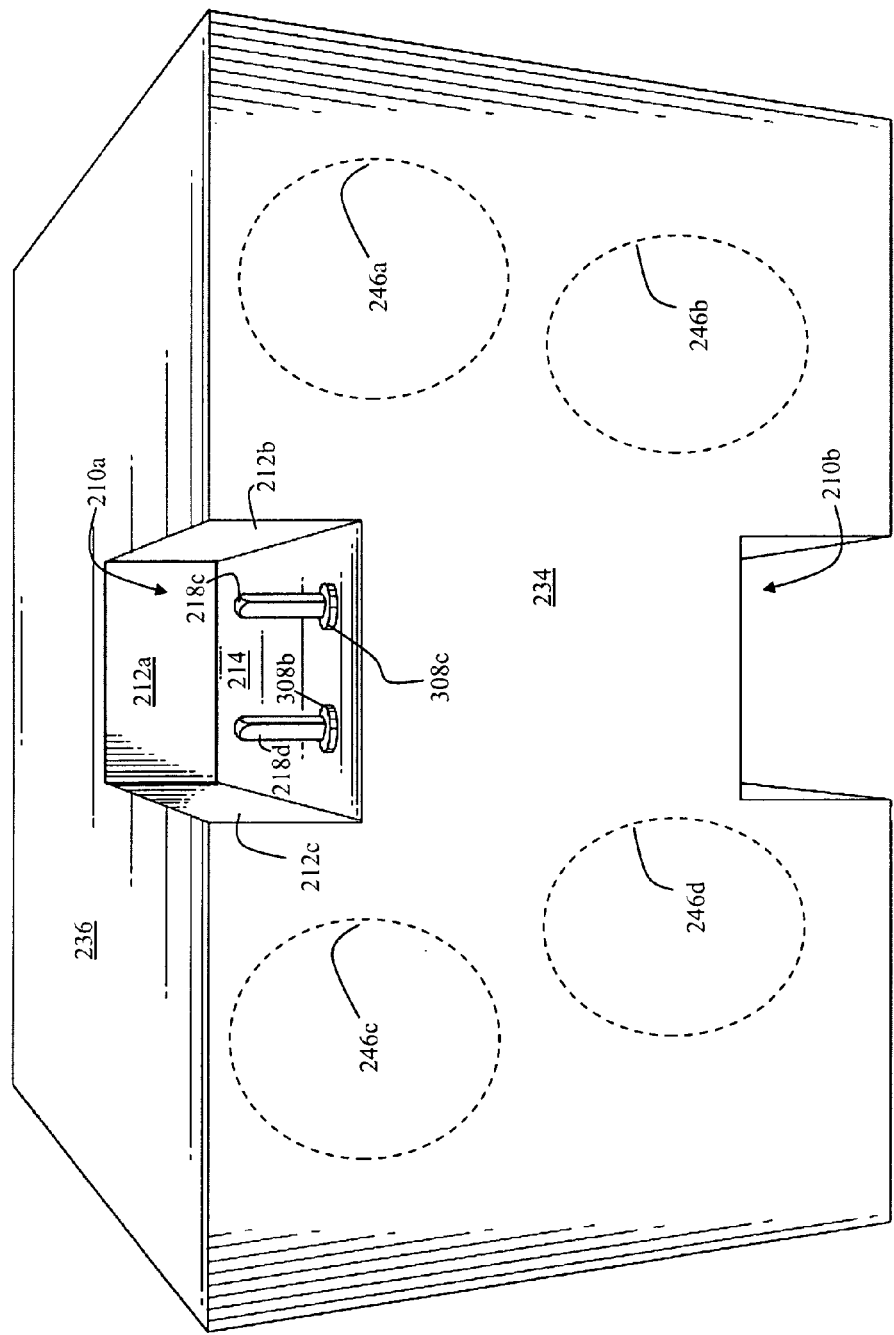
Figure 7F:
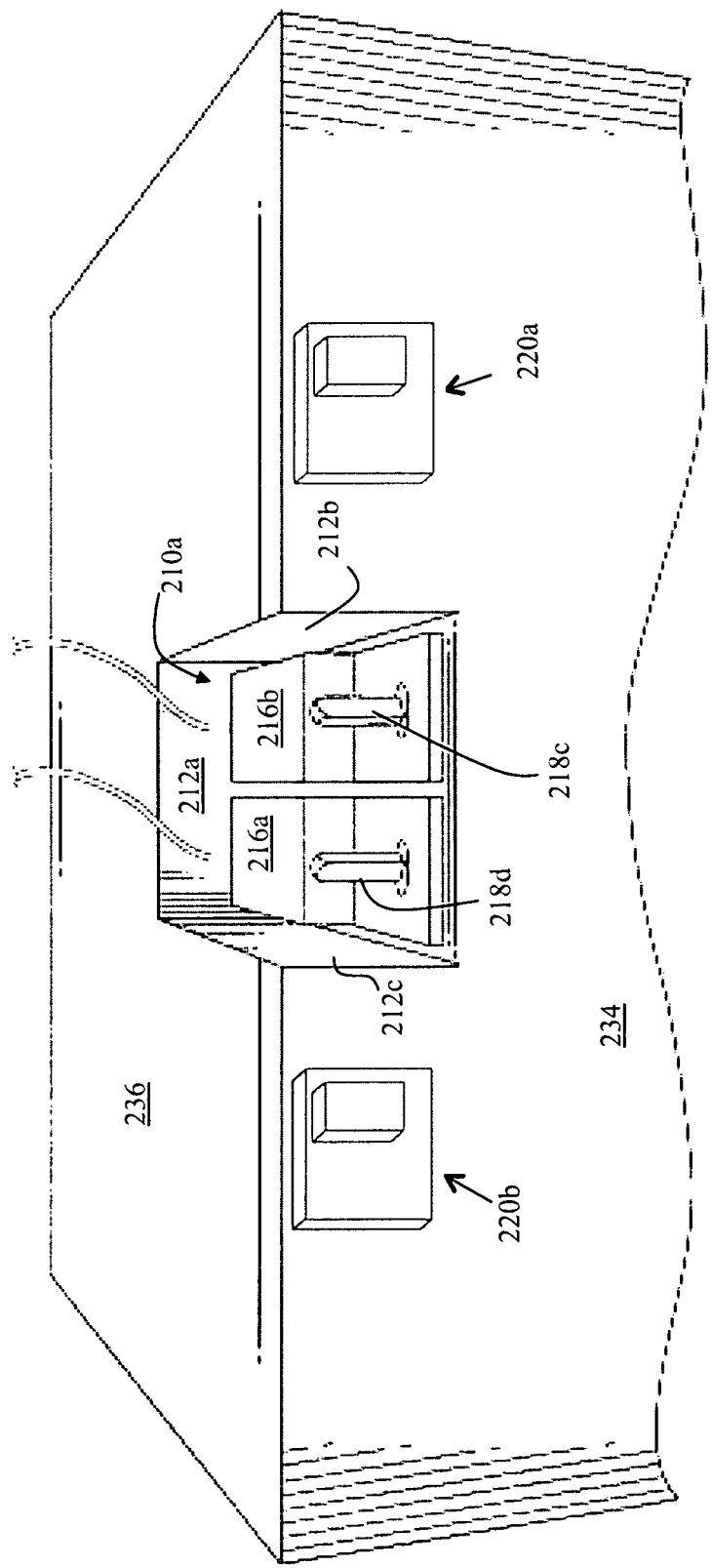
Figure 7G:
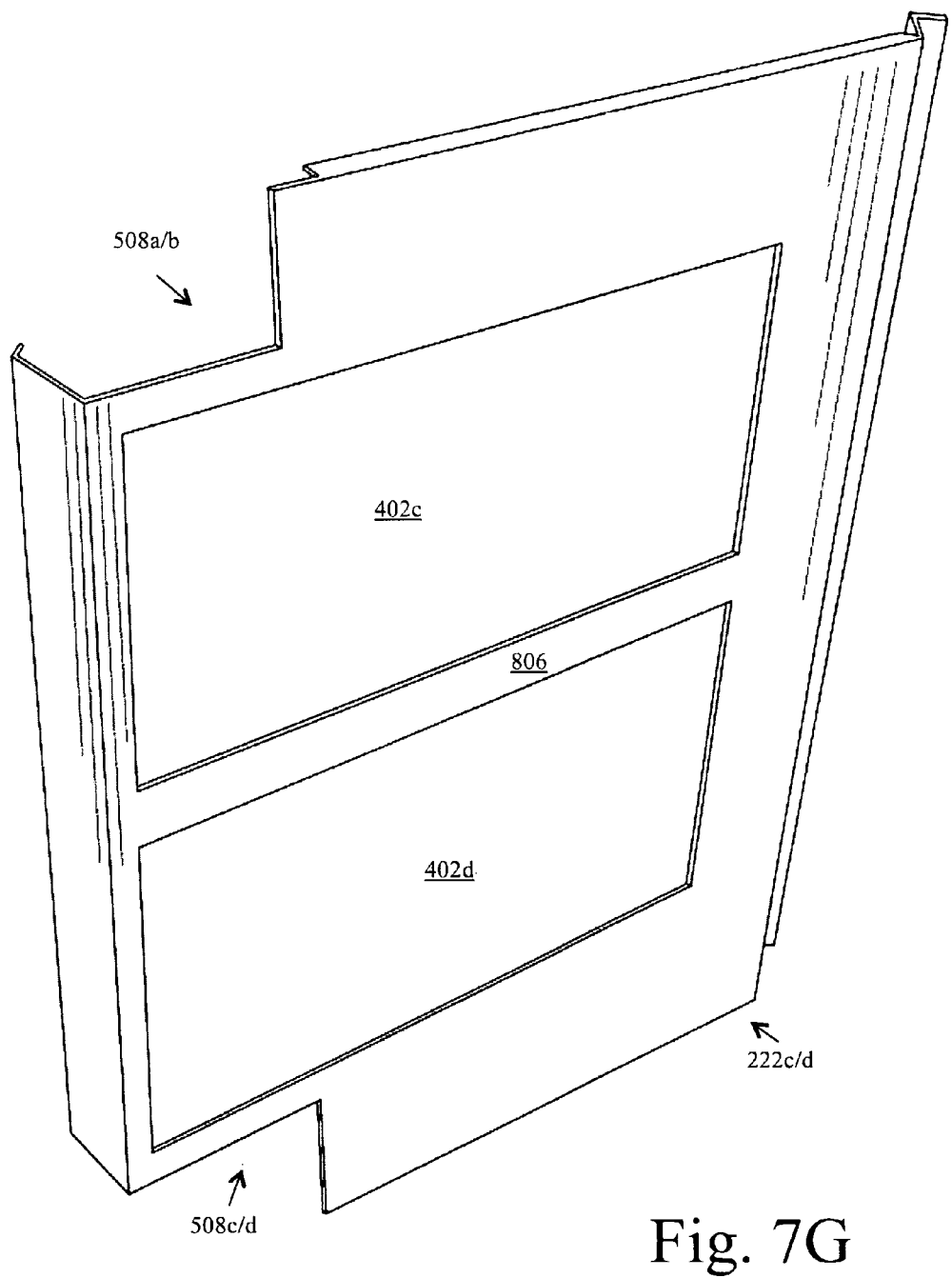

FIG. 7A is a non-limiting, exemplary plan view of the plenum module 800, and FIGS. 7B to 7D are non-limiting, exemplary perspective views of the plenum module 800 with the front panels removed to illustrate the first and second levels divided by the floor 804. FIGS. 7E and 7F are non-limiting, exemplary back view illustrations of the plenum module 800, and FIG. 7G is non-limiting, exemplary illustration of a wall panel.

As illustrated in FIGS. 7A to 7G, the plenum module 800 includes an interior space that is compartmentalized into separate chambers 204*c*, 204*d*, 204*e*, and 204*f* defined by wall panels 222*c* and 222*d*, a floor 804, and the plenum walls (lateral walls 238 and 240, the back wall 234, the top wall 236 and the bottom wall 232). The floor 804 divides the interior space into an "upper" and a "lower" level.

The compartmentalized interior includes a main ingress opening 208, a subordinate space 202, and the four the chambers 204*c*, 204*d*, 204*e*, and 204*f*. Each of the four chambers has one ingress opening 402 provided by one of the wall panels 222. That is, each wall panel 222*c* and 222*d* has two ingress openings 402 (FIG. 7G), forming a pair of ingress openings associated with each wall panel 222. As with the plenum module 100, the air flows into the plenum module 800 is from the main ingress opening 208 and into the subordinate space 202, moving into one or more chambers 204*c*, 204*d*, 204*e*, and or 204*f* via the respective ingress openings 402 that is controlled by respective number of gate mechanism, and out of the plenum module via the at least one egress opening of the chamber 204.

The gate mechanisms include four damper blades 206*b*, 206*c*, 206*d*, and 206*e* that are internally coupled within an interior of the plenum module 800. The gate mechanisms also include a set of actuating mechanisms that function to move each of the damper blades 206. The set of actuating mechanisms includes an actuating shaft 218*b*, 218*c*, 218*d*, and 218*e* that moves the respective damper blade 206*b*, 206*c*, 206*d*, and 206*e* to desired positions, with the actuating shafts 218 coupled with an actuating motor 216*a*, 216*b*, 216*c*, and 216*d* that moves the respective actuating shaft 218*b*, 218*c*, 218*d*, and 218*e*. Each of the actuating shafts 218 is a pivoting shaft that couples with a lateral end of the respective damper blade 206, enabling the damper blade 206 to swing to the desired position. As illustrated in FIGS. 7E and 7F, the exterior of the plenum module 800 includes a first recessed cavity 210*a* for accommodating the actuators (e.g., motors) 216*a* and 216*b*, and a second recessed cavities 210b for accommodating the actuators (e.g., motors) 216c and 216d. The top and bottom cavities 210a and 210b, including electrical and motor controls are mirror images of one another, and are fully described in relation to FIGS. 1 to 6 above.

The top ends of the "upper" actuating shafts 218c and 218d extend out of the interior space of the plenum module and into the "upper" outer recessed cavity 210a through upper actuator shaft holes that include respective set of bushing 308b and 308c (FIG. 7E) for facilitating the pivoting of the actuating shaft 218c and 218d about their respective axial centers (or longitudinal axis). The bottom ends of the upper actuating shafts 218c and 218d are free and coupled with the respective top ends of lower actuating shafts 218b and 218e via a set of idlers 802a and 802b. That is, the free bottom ends of the upper actuating shafts 218c and 218d are inserted into a set of idlers 802a and 802b, which are sleeve bearings or simply sleeves within which the shafts 218 may rotate, with the idlers 802a and 802b providing alignment functionality and maintaining the respective axial alignment of the shaft 218c with shaft 218b, and shaft 218d with shaft 218e.

The top ends of the lower actuating shafts 218b and 218e are free and coupled with the respective bottom ends of upper actuating shafts 218c and 218d via the set of idlers 802a and 802b. Bottom ends of the lower actuating shaft 218b and 218e extend out of the interior space of the plenum module 800 and into the outer surface through the bottom side 232 through a lower actuator shaft hole. That is, they extend out into the "lower" outer recessed cavity 210b through lower actuator shaft holes that include respective set of bushing 314b and 314c for facilitating the pivoting of the actuating shaft 218b and 218e about their respective axial centers (or longitudinal axis). The shafts 218 are pivoting shafts that are coupled with the damper blade 206 by the hinge mechanisms 242, enabling the damper blade 206 to independently rotate or swing to the desired position as the shafts 218 pivot about their respective longitudinal axis.

The shafts 218 are comprised of a single piece unit with a polygonal cross-section that are coupled with the hinge mechanisms 242 of the damper blade 206. The hinge mechanisms 242 are comprised of a set of barrels/knuckles that receive the shaft 218, and a hinge base that couple with a first lateral side of the damper blade 206 via rivets. It should be noted that each of the damper blades 206b, 206c, 206d, and 206e may also include an adjustable extension 460.

FIG. 7G is non-limiting, exemplary illustration of an exemplary wall panel of the plenum module 800. As illustrated in FIG. 7G, the illustrated wall panels 222c/d may be prefabricated and assembled within the plenum module 800 to form the chambers 204. As indicated above, the wall panels 222c/d include two ingress openings 402 that are divided by a center portion 806, which rests against the edge of the floor 804. The wall panels 222 include an upper and lower cutout sections 506 at a respective top and bottom backend 508, and a back bent section that accommodate the respective upper and lower recessed cavities 210a and 210b. In other words, the cutout section 506 and the back bent 510 provide a space 250 (FIG. 2F) needed to accommodate the recessed cavities 210a and 210b within the interior of the plenum module 800.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. For example, the material constituting the plenum module may comprise of any material, including, but not limited to, plastic, sheet metal, or any other substance constructed of natural or synthetic material. The plenum module need not be limited to a cubical or rectangular cube as illustrated, but may be varied, non-limiting examples of which may include rounded spherical exterior or other polygonal configurations. In other words, the plenum module shape may be independent of the interior spacing and arrangements. For example, the plenum module may be spherical, with walls panels comprised of commensurately appropriate design to form chambers therein, including appropriate configured damper blades. As another example, instead of using adjustable extensions 460 for the damper blade 206, stops (e.g., rubber bushing) may be installed on the damper blade 206 or, alternatively, installed on wall panels 222 (facing the subordinate space 202) to prevent full closure and sealing off of a chamber, leaving a gap opening (commensurate with the size of the stop) for release of excess air. However, this is less preferred as several sizes of stops must be shipped with the plenum module to accommodate the desired gap. It is preferred to have an adjustable extension without additional parts and with simple adjusting mechanism. Other methods of releasing of excess air may include the use of adjustable extension that may be comprised of several smaller or narrower width hinged (or coupled) panels that may be extended or collapsed like an accordion to vary the coverage (or closing) span of the damper blade 206. The illustrated slits 464 on the adjustable extension 460 may easily be fabricated on the damper blades 206 rather than the adjustable extension 460. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:
1. A switching system for motor control, comprising:
a first switch, a second switch, and a diode for selective application of power for driving a bidirectional motor based on received set of actuating signals;

where the bidirectional motor is driven in one of a first, a second, and a third directions,
wherein:
the motor driven in the first direction is actuated to a first position;
the motor driven in the second direction is actuated to a second position; and
the motor driven in the third direction is actuated to a third position;
with the first and third positions having opposite orientations and the second position is in between the first and third positions.

2. The switching system for motor control as set forth in claim 1, wherein:
the set of actuating signals include:
a first actuating signal for actuating the motor to the first position;
a second actuating signal for actuating the motor to the second position;
a third actuating signal for actuating the motor to the third position.

3. The switching system for motor control as set forth in claim 2, wherein:
the first actuating signal for actuating the motor to the first position is generated as a result of:
the first switch changing from a first state to a second state, with the second switch at the first state.

4. The switching system for motor control as set forth in claim 2, wherein:
the first actuating signal for actuating the motor to the first position is generated as a result of:
a first control signal from a control module changing a state of the first switch from a first state to a second state, with the second switch at the first state.

5. The switching system for motor control as set forth in claim 2, wherein:
the third actuating signal for actuating the motor to the third position is generated as a result of:
the second switch changing from a first state to a second state, with the first switch at the first state.

6. The switching system for motor control as set forth in claim 2, wherein:
the third actuating signal for actuating the motor to the third position is generated as a result of:
a second control signal from a control module changing a state of the second switch from a first state to a second state, with the first switch at the first state.

7. The switching system for motor control as set forth in claim 2, wherein:
the second actuating signal for actuating the motor to the second position is generated as a result of:
the first switch and the second switch changing remaining at a first state.

8. The switching system for motor control as set forth in claim 2, wherein:
the second actuating signal for actuating the motor to the second position is generated as a result of:
both the first and the second switch being at the first state with no control signal from a control module to energize the switches and change switch state, with power of the second actuating signal half-wave rectified by a diode, which actuates and maintains motor to a center position.

9. A switching system for a bidirectional motor control, comprising:
a first switch;
a second switch; and
a diode;
where the first switch at a second state and the second switch at a first state generate a first signal to drive a motor to a first position;
where the first and second switches at the first state in combination with the diode generate a second signal, which is a half-wave rectified signal to drive the motor to a second position; and
where the first switch at the first state and the second switch at the second state generate a third signal to drive the motor to a third position.

10. The switching system for motor control as set forth in claim 9, further comprising:
a power terminal block for receiving power from an external source;
a control terminal block for receiving control signals from a control module; and
an actuating terminal block for actuating the motor.

11. The switching system for motor control as set forth in claim 10, wherein:
the power terminal block includes:
a first power terminal coupled with an power line; and
a second power terminal coupled with common.

12. The switching system for motor control as set forth in claim 10, wherein:
the control terminal block includes:
a first pair of control terminals that receive and output a first control signal from a control module;
a second pair of control terminal that receive and output a second control signal from the control module;
where the first pair of control terminals is comprised of a first control signal terminal and a first control common terminal; and
where the second pair of control terminals is comprised of a second control signal terminal and a second control common terminal.

13. The switching system for motor control as set forth in claim 10, wherein:
the actuating terminal block, includes:
a first actuating terminal that is coupled with a first motor terminal;
a second actuating terminal that is coupled with a second motor terminal;
a third actuating terminal that is coupled with a third motor terminal;
where a combination of outputs from first, second, and third actuating terminals constitutes one of the first, second, third, and fourth actuating signal.

* * * * *